US008839094B2

(12) United States Patent
Pearson et al.

(10) Patent No.: US 8,839,094 B2
(45) Date of Patent: Sep. 16, 2014

(54) SYSTEM AND METHOD FOR YEARBOOK CREATION

(75) Inventors: Andrew Pearson, Eden Prairie, MN (US); Andrea Dailey, Mound, MN (US)

(73) Assignee: Jostens, Inc., Minneapolis, MN (US)

( * ) Notice: Subject to any disclaimer, the term of this patent is extended or adjusted under 35 U.S.C. 154(b) by 0 days.

(21) Appl. No.: 12/486,661

(22) Filed: Jun. 17, 2009

(65) Prior Publication Data

US 2010/0229085 A1    Sep. 9, 2010

Related U.S. Application Data

(63) Continuation-in-part of application No. 12/011,195, filed on Jan. 23, 2008.

(60) Provisional application No. 60/886,213, filed on Jan. 23, 2007, provisional application No. 61/073,199, filed on Jun. 17, 2008.

(51) Int. Cl.
  *G06F 17/30*   (2006.01)
  *G06F 17/24*   (2006.01)
  *G06F 17/40*   (2006.01)

(52) U.S. Cl.
  CPC ..................... *G06F 17/24* (2013.01)
  USPC ........... 715/243; 715/221; 715/224; 715/226; 715/255; 715/272; 715/273; 715/277; 715/733; 715/741

(58) Field of Classification Search
  CPC ....................................................... G06F 17/24
  USPC ......... 715/221, 224, 226, 243, 255, 272, 273, 715/277, 733, 741
  See application file for complete search history.

(56) References Cited

U.S. PATENT DOCUMENTS

| 3,892,427 A | 7/1975 | Kraynak et al. |
| 4,877,269 A | 10/1989 | Callaghan et al. |

(Continued)

FOREIGN PATENT DOCUMENTS

| AU | 675344 | 1/1997 |
| CA | 2166963 | 1/2000 |

(Continued)

OTHER PUBLICATIONS

Konomi Senda, Word 2003, Perfect Master, Windows XP Full Support, Japan, Hideaki Makitani, Dec. 8, 2003, First Edition, First Publication, p. 723-734.

(Continued)

*Primary Examiner* — Stephen Hong
*Assistant Examiner* — Wilson Tsui
(74) *Attorney, Agent, or Firm* — Winthrop & Weinstine, P.A.

(57) ABSTRACT

A yearbook system is provided. The yearbook system provides a single, extensive resource to plan, create, educate about, sell, and distribute yearbooks. The system further provides an integrated yearbook system management and yearbook production system to enable the production of the yearbook to a printed output. A yearbook server hosts a client site and a client database. The client site is enables the school to plan, create, sell and distribute a yearbook. Further, they system may be used to create the yearbook online. A production server hosts a production database synchronizes with the yearbook server, providing images to the client for use in creating the yearbook, and accepting completed created pages submitted by the school from the yearbook server. The production server translates the created pages into the format to proceed through the regular preparation for production of the yearbook.

18 Claims, 36 Drawing Sheets

(56) References Cited

U.S. PATENT DOCUMENTS

| | | | |
|---|---|---|---|
| 5,114,291 A | 5/1992 | Hefty | |
| 5,181,162 A | 1/1993 | Smith et al. | |
| 5,190,316 A | 3/1993 | Hefty | |
| 5,220,657 A | 6/1993 | Bly et al. | |
| 5,293,475 A | 3/1994 | Henningan et al. | |
| 5,323,312 A | 6/1994 | Saito et al. | |
| 5,390,354 A | 2/1995 | de Heus et al. | |
| 5,434,961 A | 7/1995 | Horiuchi et al. | |
| 5,475,805 A | 12/1995 | Murata | |
| 5,478,120 A | 12/1995 | D'Andrea | |
| 5,513,117 A | 4/1996 | Small | |
| 5,517,621 A | 5/1996 | Fukui et al. | |
| 5,524,932 A | 6/1996 | Kalisher | |
| 5,552,994 A | 9/1996 | Cannon et al. | |
| 5,555,362 A | 9/1996 | Yamashita et al. | |
| 5,600,563 A | 2/1997 | Cannon et al. | |
| 5,652,421 A | 7/1997 | Veeneman et al. | |
| 5,715,325 A | 2/1998 | Bang et al. | |
| 5,729,674 A | 3/1998 | Rosewarne et al. | |
| 5,748,484 A | 5/1998 | Cannon et al. | |
| 5,751,590 A | 5/1998 | Cannon et al. | |
| 5,787,419 A | 7/1998 | Sato et al. | |
| 5,838,836 A * | 11/1998 | Omvik | 382/276 |
| 5,850,520 A | 12/1998 | Griebenow et al. | |
| 5,953,733 A | 9/1999 | Langford-Wilson | |
| 6,005,560 A | 12/1999 | Gill et al. | |
| 6,088,702 A | 7/2000 | Plantz et al. | |
| 6,092,054 A | 7/2000 | Tackbary et al. | |
| 6,111,586 A | 8/2000 | Ikeda et al. | |
| 6,123,362 A | 9/2000 | Squilla et al. | |
| 6,134,568 A | 10/2000 | Tonkin | |
| 6,138,106 A | 10/2000 | Walker et al. | |
| 6,142,530 A | 11/2000 | Emmerich | |
| 6,161,113 A | 12/2000 | Mora et al. | |
| 6,301,370 B1 | 10/2001 | Steffens et al. | |
| 6,324,545 B1 | 11/2001 | Morag | |
| 6,366,918 B1 | 4/2002 | Guttman et al. | |
| 6,370,514 B1 | 4/2002 | Messner | |
| 6,505,202 B1 | 1/2003 | Mosquera et al. | |
| 6,507,845 B1 | 1/2003 | Cohen et al. | |
| 6,542,936 B1 | 4/2003 | Mayle et al. | |
| 6,583,799 B1 | 6/2003 | Manolis et al. | |
| 6,632,251 B1 | 10/2003 | Rutten et al. | |
| 6,681,032 B2 | 1/2004 | Bortolussi et al. | |
| 6,683,611 B1 | 1/2004 | Cleveland | |
| 6,745,238 B1 * | 6/2004 | Giljum et al. | 709/219 |
| 2,672,761 A1 | 11/2004 | Mohr et al. | |
| 6,826,534 B1 | 11/2004 | Gupta et al. | |
| 6,898,601 B2 * | 5/2005 | Amado et al. | 1/1 |
| 7,107,249 B2 | 9/2006 | Dively et al. | |
| 7,117,254 B2 | 10/2006 | Lunt et al. | |
| 7,148,990 B2 | 12/2006 | Atkins et al. | |
| 7,188,310 B2 | 3/2007 | Schwartzkopf | |
| 7,209,889 B1 | 4/2007 | Whitfield | |
| 7,290,031 B2 | 10/2007 | Yamashita | |
| 7,343,320 B1 | 3/2008 | Treyz et al. | |
| 7,346,656 B2 * | 3/2008 | Worthen | 709/204 |
| 7,474,801 B2 | 1/2009 | Teo et al. | |
| 7,509,570 B2 | 3/2009 | Narusawa | |
| 7,599,527 B2 | 10/2009 | Shah et al. | |
| 7,599,938 B1 | 10/2009 | Harrison, Jr. | |
| 7,600,186 B2 | 10/2009 | Saha et al. | |
| 7,636,450 B1 | 12/2009 | Bourdev | |
| 7,643,671 B2 | 1/2010 | Dong et al. | |
| 7,684,595 B2 | 3/2010 | Kamgar-Parsi et al. | |
| 7,757,166 B2 | 7/2010 | Nelson et al. | |
| 7,853,100 B2 * | 12/2010 | Sundstrom et al. | 382/311 |
| 7,904,322 B2 | 3/2011 | Gauger | |
| 7,991,203 B2 | 8/2011 | Tsai | |
| 8,024,658 B1 | 9/2011 | Fagans et al. | |
| 8,130,276 B2 | 3/2012 | Holmes | |
| 8,131,114 B2 | 3/2012 | Wang et al. | |
| 2002/0032633 A1 | 3/2002 | Okumura | |
| 2002/0059340 A1 | 5/2002 | Centrone | |
| 2002/0077848 A1 | 6/2002 | Campbell | |
| 2002/0091739 A1 | 7/2002 | Ferlitsch et al. | |
| 2002/0103813 A1 | 8/2002 | Frigon | |
| 2002/0120757 A1 | 8/2002 | Sutherland et al. | |
| 2002/0167538 A1 | 11/2002 | Bhetanabhotla | |
| 2002/0178078 A1 | 11/2002 | O'Toole | |
| 2003/0056177 A1 | 3/2003 | Nara et al. | |
| 2003/0078856 A1 | 4/2003 | Zubi | |
| 2003/0140315 A1 | 7/2003 | Blumberg et al. | |
| 2003/0220905 A1 | 11/2003 | Amado et al. | |
| 2003/0221162 A1 | 11/2003 | Sridhar | |
| 2004/0003342 A1 | 1/2004 | Keane et al. | |
| 2004/0032607 A1 | 2/2004 | Ohkuma et al. | |
| 2004/0107125 A1 | 6/2004 | Guheen et al. | |
| 2004/0122696 A1 * | 6/2004 | Beringer | 705/1 |
| 2004/0165218 A1 | 8/2004 | Fredlund et al. | |
| 2004/0167796 A1 | 8/2004 | Lynch et al. | |
| 2004/0194033 A1 | 9/2004 | Holzwarth et al. | |
| 2004/0199867 A1 | 10/2004 | Brandenborg | |
| 2004/0254859 A1 | 12/2004 | Aslanian, Jr. | |
| 2005/0055624 A1 | 3/2005 | Seeman et al. | |
| 2005/0125726 A1 | 6/2005 | Harper et al. | |
| 2005/0154675 A1 | 7/2005 | Johnson, Jr. | |
| 2006/0023923 A1 | 2/2006 | Geng et al. | |
| 2006/0031746 A1 | 2/2006 | Toepfer et al. | |
| 2006/0109517 A1 | 5/2006 | Catalan | |
| 2006/0129924 A1 | 6/2006 | Nelson et al. | |
| 2006/0178918 A1 | 8/2006 | Mikurak | |
| 2006/0190808 A1 | 8/2006 | Balthaser | |
| 2006/0206836 A1 | 9/2006 | Wessling et al. | |
| 2007/0043830 A1 | 2/2007 | Housenbold | |
| 2007/0083851 A1 | 4/2007 | Huang et al. | |
| 2007/0130509 A1 * | 6/2007 | Gombert et al. | 715/513 |
| 2007/0150542 A1 | 6/2007 | Sommerer | |
| 2007/0188597 A1 | 8/2007 | Kenoyer | |
| 2008/0013801 A1 | 1/2008 | Reed et al. | |
| 2008/0154931 A1 | 6/2008 | Jacobs et al. | |
| 2008/0189609 A1 | 8/2008 | Larson et al. | |
| 2008/0205655 A1 | 8/2008 | Wilkins et al. | |
| 2008/0292147 A1 | 11/2008 | Bronstein et al. | |
| 2008/0294977 A1 | 11/2008 | Friedman et al. | |
| 2009/0141950 A1 | 6/2009 | Ryu | |
| 2009/0158182 A1 | 6/2009 | McCurdy et al. | |
| 2009/0158183 A1 | 6/2009 | McCurdy et al. | |
| 2009/0185723 A1 | 7/2009 | Kurtz et al. | |
| 2009/0216569 A1 | 8/2009 | Bonev et al. | |
| 2009/0248703 A1 | 10/2009 | Tsukagoshi et al. | |
| 2009/0252383 A1 | 10/2009 | Adam et al. | |
| 2010/0050090 A1 | 2/2010 | Leebow | |
| 2010/0054601 A1 | 3/2010 | Anbalagan et al. | |
| 2010/0070572 A1 | 3/2010 | Olson et al. | |
| 2010/0070573 A1 | 3/2010 | Olson et al. | |
| 2010/0070579 A1 | 3/2010 | Olson et al. | |
| 2010/0114596 A1 | 5/2010 | Williams et al. | |
| 2010/0150407 A1 | 6/2010 | Cheswick | |
| 2010/0172551 A1 | 7/2010 | Gilley et al. | |
| 2010/0216441 A1 | 8/2010 | Larsson et al. | |
| 2010/0229085 A1 | 9/2010 | Nelson et al. | |
| 2010/0266155 A1 | 10/2010 | Goell et al. | |
| 2010/0266167 A1 | 10/2010 | Kodesh et al. | |
| 2010/0287053 A1 | 11/2010 | Ganong et al. | |
| 2010/0322507 A1 | 12/2010 | Gunaratne | |
| 2011/0038512 A1 | 2/2011 | Petrou et al. | |
| 2011/0123071 A1 | 5/2011 | Shah et al. | |
| 2011/0135165 A1 | 6/2011 | Wechsler et al. | |
| 2011/0182482 A1 | 7/2011 | Winters et al. | |
| 2011/0188713 A1 | 8/2011 | Chin et al. | |
| 2012/0054072 A1 | 3/2012 | McCurdy et al. | |
| 2012/0054600 A1 | 3/2012 | McCurdy et al. | |
| 2012/0054647 A1 | 3/2012 | McCurdy et al. | |
| 2012/0106806 A1 | 5/2012 | Folta et al. | |
| 2012/0113275 A1 | 5/2012 | Bladel et al. | |
| 2012/0147167 A1 | 6/2012 | Manson et al. | |
| 2012/0328168 A1 | 12/2012 | Dailey et al. | |
| 2012/0328169 A1 | 12/2012 | Heeter et al. | |

FOREIGN PATENT DOCUMENTS

| | | |
|---|---|---|
| JP | 2001-256210 | 9/2001 |

(56) References Cited

FOREIGN PATENT DOCUMENTS

| | | |
|---|---|---|
| JP | 2003-177503 | 6/2003 |
| JP | 2004-258920 | 9/2004 |
| JP | 2006277741 A | 12/2006 |
| KR | 20010032209 | 4/2001 |
| KR | 1020010057329 A | 7/2001 |
| KR | 20020012582 | 2/2002 |
| KR | 1020020061394 A | 7/2002 |
| KR | 1020040028641 | 4/2004 |
| WO | 2006063327 A2 | 6/2006 |
| WO | 2006127660 A2 | 11/2006 |

OTHER PUBLICATIONS

International Search Report for related PCT Application No. PCT/US2012/023259 mailed May 15, 2012 (3 pp.).

International Search Report for related PCT Application PCT/US2012/023324 dated May 23, 2012.

Translation of Notice of Final Rejection for related Japanese Patent Application 2009-547306 mailed May 22, 2012 (2 pgs.).

\* cited by examiner

PLAN - FONTS jostens™ Yearbook Avenue™ ⟵ 80

Topeka 9 Y Job: 60127
Welcome Yearbook Adviser 21-JUL-04
Sign Out  Edit Personal Login  Search Select Fonts Please choose from the available fonts those to be used in the creation of your yearbook.

Font Preview:

Abyss

ABCDEFGHIJKLM
NOPQRSTUVWXYZ
abcdefghijklm
nopqrstuvwxyz
0123456789

The quick brown fox
jumped over the lazy dog

View complete Font List

86 — Font Categories:
[Headline ▶]

84 — Available Fonts:
[Abyss]
[ADD]

82 — Your Font Collection:
None Selected

FIG. 5

PLAN - STYLES jostens Yearbook Avenue™ ― 88

Topeka 9 Y Job: 60127
Welcome Yearbook Adviser 21-JUL-04
Sign Out   Edit Personal Login   Search This will set the desired font(s) in all pages within your book. However, you can change the font on any of the pages by selecting text and editing it individually.

View
Plan Ladder
Build Ladder

Actions
Apply Font Style

Set Font Style: ― 90

Set Headline Font
[Times ▼]
This will set all type in your book of size 24pt and larger to this font.

Set Sub-Head Font ― 92
[Times ▼]
This will set all type in your book between the sizes of 13-23pt to this font.

Set Captive/Body Font ― 94
[Times ▼]
This will set all type in your book between the sizes of 6-12pt to this font.

Headline Font:
Times
ABCDEFGHIJKLM
NOPQRSTUVWXYZ
abcdefghijklm
nopqrstuvwxyz
0123456789

The quick brown fox jumped over the lazy dog.

Body Font:
Times
ABCDEFGHIJKLM
NOPQRSTUVWXYZ
abcdefghijklm
nopqrstuvwxyz
0123456789

The quick brown fox jumped over the lazy dog.

Caption Font:
Times
ABCDEFGHIJKLM
NOPQRSTUVWXYZ
abcdefghijklm
nopqrstuvwxyz
0123456789

The quick brown fox jumped over the lazy dog.

FIG. 6

PLAN - COMMUNITY PHOTO SITE ⟶ 96

Topeka 9 Y Job: 60127

Welcome Yearbook Adviser 21-JUL-04

Sign Out   Edit Personal Login   Search jostens Yearbook Avenue™

Photo Submission on Web Site

Do you want to have a Web site for parents and others to upload photos for the yearbook staff's use? ☐

Enter a start date when the site becomes available: _____ (MM/DD/YYYY) ⟶ 98

Enter an end date when the site is turned off: _____ (MM/DD/YYYY) ⟶ 100

The user id for your Web site is: 7000038 ⟶ 102

Enter the password for you Web Site: _____ ⟶ 104

Enter the maximum number of images to be submitted: _____ (400 or less) ⟶ 106

Number of images submitted:

Do you want the site enabled? ☐

The location for your Web site is: https://demoportal.jostens.com/login.asp ⟶ 108

[ Save ]

FIG. 7

PLAN - STAFF

Yearbook Avenue™

Topeka 9 Y Job: 60127
Welcome Yearbook Adviser 21-JUL-04

Sign Out    Edit Personal Login    Search

Maintain Yearbook Staff

*Last Name    *First Name    Email Address

Add new staff member here

— 112    — 114

[ Padmanabhan ] [ Devan ]

*Denotes required field

[ ADD ]

[ UPDATE ] [ DELETE ]

PLAN - SCHOOL INFO jostens Yearbook Avenue™

Topeka 9 Y Job: 60127

Welcome Yearbook Adviser 21-JUL-04

Sign Out  Edit Personal Login  Search

— 118

School Information
SCHOOL INFORMATION

120 — Topeka 9 Y
112 { Address: 7000 S Adams
City: Topeka
State: KS      Zip Code: 66609

124 — CONTACT INFORMATION

Title:

First Name: [Vickie]

First Name: [Broxterman]

Work Phone: [        ]     Home Phone: [            ]

Email Address: [            ]

Alt Email Address: [            ]

[Save]

School information on this Yearbook Avenue Page is updated nightly.
Contact information is always current.

*FIG. 9*

HOME - CALENDAR jostens Yearbook Avenue™ — 138

Topeka 9 Y Job: 60127
Welcome Yearbook Adviser 21-JUL-04
Sign Out   Edit Personal Login   Search

Project Calendar: Weekly View

○ WEEKLY VIEW   ○ RECENTLY ADDED   ○ MONTHLY SUMMARY

For the week of 7/18/2004 to 7/24/2004

June 2004
S  M  T  W  T  F  S
30 31  1  2  3  4  5
 6  7  8  9 10 11 12
13 14 15 16 17 18 19
20 21 22 23 24 25 26
27 28 29 30  1  2  3

▲

July 2004
S  M  T  W  T  F  S
27 28 29 30  1  2  3
 4  5  6  7  8  9 10
11 12 13 14 15 16 17
18 19 20 21 22 23 24
25 26 27 28 29 30 31

▼

August 2004
S  M  T  W  T  F  S
 1  2  3  4  5  6  7
 8  9 10 11 12 13 14
15 16 17 18 19 20 21
22 23 24 25 26 27 28
29 30 31  1  2  3  4

Select month and year:
Jul ▶  2004 ▶

Sunday July 18
140 — finish year book          ⊕ ADD NOTE
142 — NOTES                     ⊜ EDIT ⊜ DELETE Monday July 19
finish year book                ⊜ EDIT ⊜ DELETE
NOTES Tuesday July 20                 ⊕ ADD NOTE Wednesday July 21               ⊕ ADD NOTE Thursday July 22                ⊕ ADD NOTE Friday July 23                  ⊕ ADD NOTE

FIG. 11

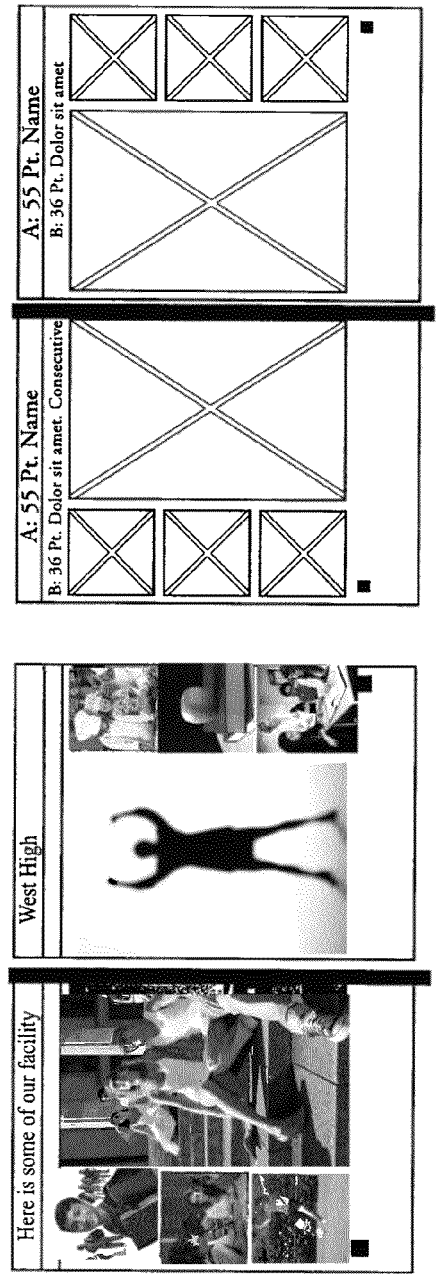
FIG. 12

School Name

Grad. Year

Logo

FIG. 19

Panel Pages
View
Plan Ladder
Build Ladder
Move Pages

Selected Category
3. Portraits
2. EPP_Color
1. EPP_B&W ▼

Categories marked with an asterisk have not been placed.

Photo Window Shape:
○ Oval  ● Rectangle

Name Placement:
○ Along outside edge  ● Below photos

Photo Size: ☐

210

Page title for selected category:
EPP_B&W

Preview of Total Number of Pages:
Portraits could not be flowed into this template
Try using a smaller Photo Size.

---

To place your portraits, click on the PAGE ICON you would like the selected categories to start on.

212 { ☐ - Not Started   ⊡ - in process   ☐ - Completed Page   ■ - Submitted Page   ■ - In Production   🔒 - Locked Page

CREATE - MESSAGES jostens™ Yearbook Avenue™

Topeka 9 Y Job: 60127

Welcome Yearbook Adviser 21-JUL-04

Sign Out   Edit Personal Login   Search

Page Submission Information ← 246

YOUR PAGE SUBMISSION MESSAGES

No messages available

Message                                              Date

Information on this Yearbook Avenue Page is updated nightly

FIG. 24B

CREATE - COMPLETE PAGE GRID jostens Yearbook Avenue™

Topeka 9 Y Job: 60127
Welcome Yearbook Adviser 21-JUL-04
Sign Out   Edit Personal Login   Search Cover Information   248

YOUR COMPLETE PAGE GRID

Page Grid   Multiples   Sigs

Color Status Code Legend
[PC] Process Color Specified   [SC] Second Color Specified   [CI] Color Indicated (initial production flag)

If a date appears beneath a page number, this indicates that the page has been received.

Please note that "Missing" (in red) indicates pages needed to complete a color multiple.

Color pages will now show as color until they clear the color markup area in the yearbook plant. Depending on production loads, there could be a delay in recording this information

*Information on this Yearbook Avenue Page is updated nightly*

Home Ordering Made Easy (HOME) Program

Professional Marketing for Any Budget

Promote your yearbook with a colorful flyer you can create right in your own yearbook room. Home Ordering Made Easy (HOME) is a Jostens sales tool for schools that want to reach parents at home to involve them in the purchase decision. The program allows you to:

- Design an affordable, professional, customized yearbook sales flyer online
- Create a sales flyer, order form, and collection envelope in one, so it's easier than ever for parents to order and you to collect payments
- Accept and process credit card orders through a school-specific location on the jostens.com Web site

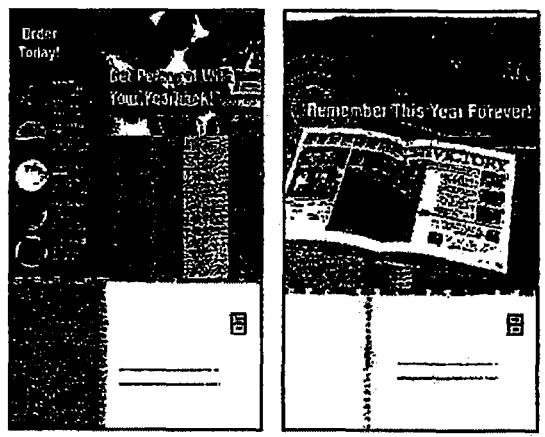

HOME makes it easy for you to market and sell your yearbook. And by involving parents in the yearbook buying decision you can increase your yearbook and yearbook add-on sales.

Speak with your yearbook representative to find out how simple it is to create a professional flyer with your unique yearbook sales offering including:

- A four-color flyer promoting your yearbook sale
- Flexibility to determine the pricing offer, and message that meets your needs
- Easy-to-determine reporting for all Web transactions Put the HOME program to work for you and create a customized yearbook offer to send to all your students and their parents. While you manage the selling process from start to finish, this tool will allow you to benefit from the influence that parents have in the buying decision.

Contact your Jostens Yearbook Representative today to get started creating your school's yearbook flyer.

FIG. 28

SELL - HOME WEB SALES
/ 280 jostens™ Yearbook Avenue™

Topeka 9 Y Job: 60127
Welcome Yearbook Adviser 21-JUL-04
Sign Out   Edit Personal Login   Search

HOME Sales Results

This page shows the sales results to date for any credit card purchases made on-line for your flyers.

Please note, the button to download your web sales to ItPays will not be active until after your first flyer's web order deadline has passed. If you have multiple flyers, subsequent flyers will have the student orders added to the download as their web order deadlines have passed.

[Download Now]

To request a refund for an order places via jostens.com, please click on the student details link.

Total Sales Results - All Flyers

| Number of orders | Product Sales | Sales Tax | Total $ |
|---|---|---|---|
| 0 | $0.00 | $0.00 | $0.00 |

This Yearbook Avenue Information updated nightly

FIG. 29

CONTACT US - MY JOSTENS CONTACTS
— 282

Yearbook Avenue™ (jostens)

Topeka 9 Y Job: 60127
Welcome Yearbook Adviser 21-JUL-04

Sign Out    Edit Personal Login    Search

Jostens Contact Information

Your Sales Representative is Customer Service Topeka
Email Address:

Your Yearbook Plant is Topeka
4000 South Adams
P.O. Box 1903
Topeka, KS 66601
Phone: 1-800-262-9725

For Technical Support Call:
(800) 328-2435 USA
(800) 665-7597 Canada

For After Hours Technical Support:
Email us here with the necessary information so we can assist you.

For questions relating to the Jostens Yearbook Avenue Web site
e-mail ytssupport@jostens.com

This on this Yearbook Avenue Page is updated nightly

FIG. 30

SYSTEM AND METHOD FOR YEARBOOK CREATION

FIELD OF THE INVENTION

This invention relates generally to a system and method for creating yearbooks, and more specifically to an online system and method for creating yearbooks.

BACKGROUND OF THE INVENTION

Yearbooks are currently developed using traditional desktop publishing applications such as PageMaker, Quark and InDesign. Traditional creation includes using paste-ups in a process that is typically very time-consuming.

BRIEF SUMMARY OF THE INVENTION

The present invention relates to a system and method for creating yearbooks. The yearbook system provides a single, extensive resource to plan, create, educate about, sell, and distribute yearbooks. The system further provides an integrated yearbook system management and yearbook production system to enable the production of the yearbook to a printed output.

The yearbook system comprises a user component and a production component. The user component is used by the user to design and create the yearbook. The user component may include user-specific content and informational content. The production component is used to covert the created yearbook into a printed output. The user component and the production component interact such that submissions are made to the production component via the user component and the production component can communicate with the user component regarding the submissions.

The method for creating a yearbook comprises user planning of the yearbook, user development of the yearbook and user submission of completed portions of the yearbook. The method further comprises production review of the submitted portions of the yearbook, production communication to a user regarding the submission portions of the yearbook and production conversion of the submitted portions of the yearbook into a printed output.

While multiple embodiments are disclosed, still other embodiments of the present teachings will become apparent to those skilled in the art from the following detailed description, which shows and described illustrative embodiments. As will be realized, the teachings are capable of modifications in various obvious aspects, all without departing from the spirit and scope of the present teachings. Accordingly, the drawings and detailed description are to be regarded as illustrative in nature and not restrictive.

BRIEF DESCRIPTION OF THE DRAWINGS

FIG. 5 illustrates a fonts page in accordance with one embodiment of the present invention.

FIG. 6 illustrates a styles page in accordance with one embodiment of the present invention.

FIG. 7 illustrates a photo submission website page in accordance with one embodiment of the present invention.

FIG. 8 illustrates a yearbook staff maintenance screen in accordance with one embodiment of the present invention.

FIG. 9 illustrates a school information page in accordance with one embodiment of the present invention.

FIG. 11 illustrates a yearbook system calendar page in accordance with one embodiment of the present invention.

FIG. 12 illustrates a virtual book of a yearbook being created with a yearbook system in accordance with one embodiment of the present invention.

FIG. 19 illustrates a cover template in accordance with one embodiment of the present invention.

FIG. 20 illustrates a panel pages screen in accordance with one embodiment of the present invention.

FIG. 22 illustrates an image library page in accordance with one embodiment of the present invention.

FIG. 24B illustrates a messages page in accordance with one embodiment of the present invention.

FIG. 26 illustrates a page status grid in accordance with one embodiment of the present invention.

FIG. 27 illustrates a summary report in accordance with one embodiment of the present invention.

FIG. 28 illustrates a HOME flyer page in accordance with one embodiment of the present invention.

FIG. 29 illustrates a HOME web sales page in accordance with one embodiment of the present invention.

FIG. 30 illustrates a contact information page in accordance with one embodiment of the present invention.

DETAILED DESCRIPTION OF THE INVENTION

The present invention relates to a yearbook system to plan, create, educate about, sell, and distribute yearbooks. The yearbook system provides a single extensive resource for schools to design, create, sell and distribute yearbooks. The system further provides an integrated yearbook system management and yearbook production system to enable the production of the yearbook to a printed output. In some embodiments, the system facilitates contributions to the yearbook by community members outside of yearbook staff, such as parents of students appearing in the yearbook.

Of course, in addition to creating yearbooks such as those typically distributed in high schools and some middle schools, the present invention may be used to create memory books such as those distributed at elementary schools and small middle schools or other books. Yearbooks generally are hard cover, have 50 to several hundred pages (page range may vary), include endsheets and tip-ins, and may be produced in color or in black and white. Memory books generally are often soft cover, have 8-64 pages (page range may vary), and may be produced in color or in black and white. Generally, the present invention may be applied to any collaborative creation process—for books or other output. Thus, while the present invention is generally described in terms of yearbooks, the invention is equally suited for other books.

Figure 1:
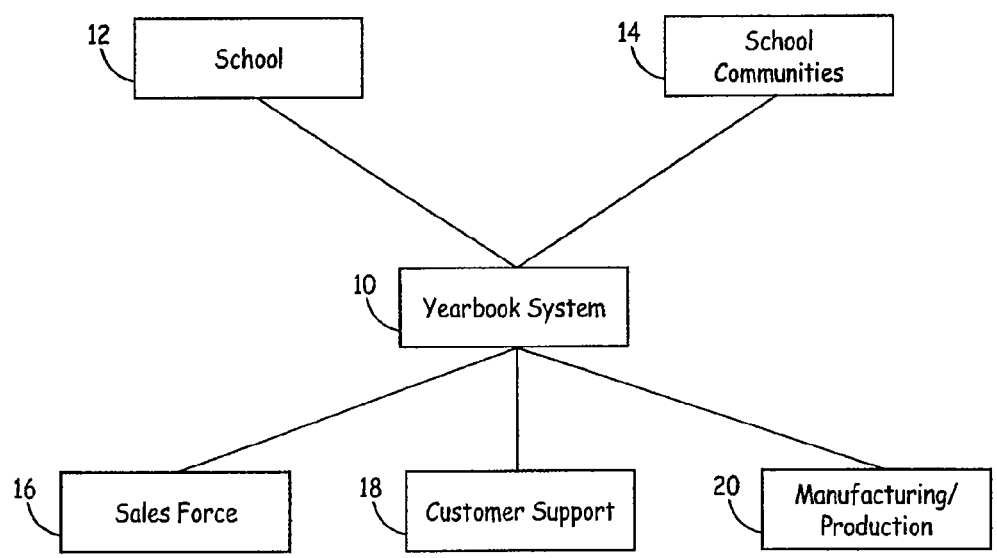
FIG. 1 illustrates interaction of a yearbook system in accordance with one embodiment of the present invention.

As shown in FIG. 1, the system 10 interacts with schools 12, school communities 14, a sales force 16, customer support 18, and manufacturing 20. Schools 12 may interact with the system 10 while designing a yearbook using a desk top publishing application or an online creation tool. Unless specified otherwise, the description of the system 10 is intended to encompass schools using a desk top publishing application as well as schools using an online creation tool. In some embodiments, the system 10 may be coordinated with a desk top publishing application such that a school can begin creation of a yearbook in a traditional manner, submit the created yearbook to production, and the created yearbook may be displayed online by the system.

School Use of the Yearbook System

Figure 2:
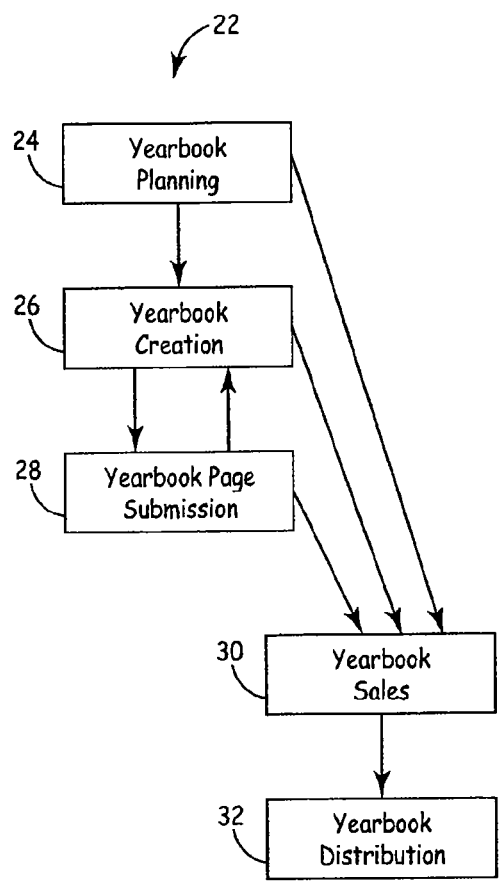
FIG. 2 illustrates a flowchart of the user side of a yearbook process in accordance with one embodiment of the present invention.

The yearbook system of the present invention provides a tool for use from the start to the finish of the yearbook process. Thus, the yearbook system, in addition to use in creating a yearbook, may be used for managing staff, educating staff regarding the yearbook process, merchandising, selling, and distributing the yearbook. In some embodiments, the yearbook system further permits contribution by people other than the yearbook staff. FIG. 2 illustrates a process flow 22 of a school using the yearbook system during the yearbook process. Prior to creating the yearbook, yearbook staff plan each portion of the yearbook 24—including cover, portrait pages, and activity pages. Planning may be accomplished by determining the sections to be included in the yearbook, determining what pages are to be devoted to which sections, choosing a template for each page, and assigning a staff member to each page. These planning selections may be incorporated into an easy-to-use planning ladder, described more fully below in relation to FIG. 4.

During creation of the yearbook 26, staff members develop each page laid out during the planning stage. Development of each page may be done using a developer including photo manipulation, page manipulation, text, and graphic capabilities. Creation may involve customizing the template used, adding text, photos, clipart, or colors. In some embodiments, pages may be designated as "parent ad" pages. These pages may be customized by parents rather than yearbook staff. Such customization may be done through the school or through a production facility, described more fully below. It is to be appreciated that, during creation, users of the yearbook system may vary from the plan and that the plan may merely provide guidance during creation. Once the page is complete, the page may be submitted for production 28. Submissions may be done by individual page or in a grouping of pages. Submission may be done from a build ladder (described below) or from the developer. If the page was created using a desktop publishing application, a printed page from a production facility may be returned to the staff for proofing. The yearbook staff may also be responsible for the selling of the yearbooks 30. The yearbook staff may use the present invention to design merchandising materials and track sales of the yearbook. After the yearbook has been sold and printed, the present invention may be used for aid in the distribution of the yearbooks 32.

Figure 3:
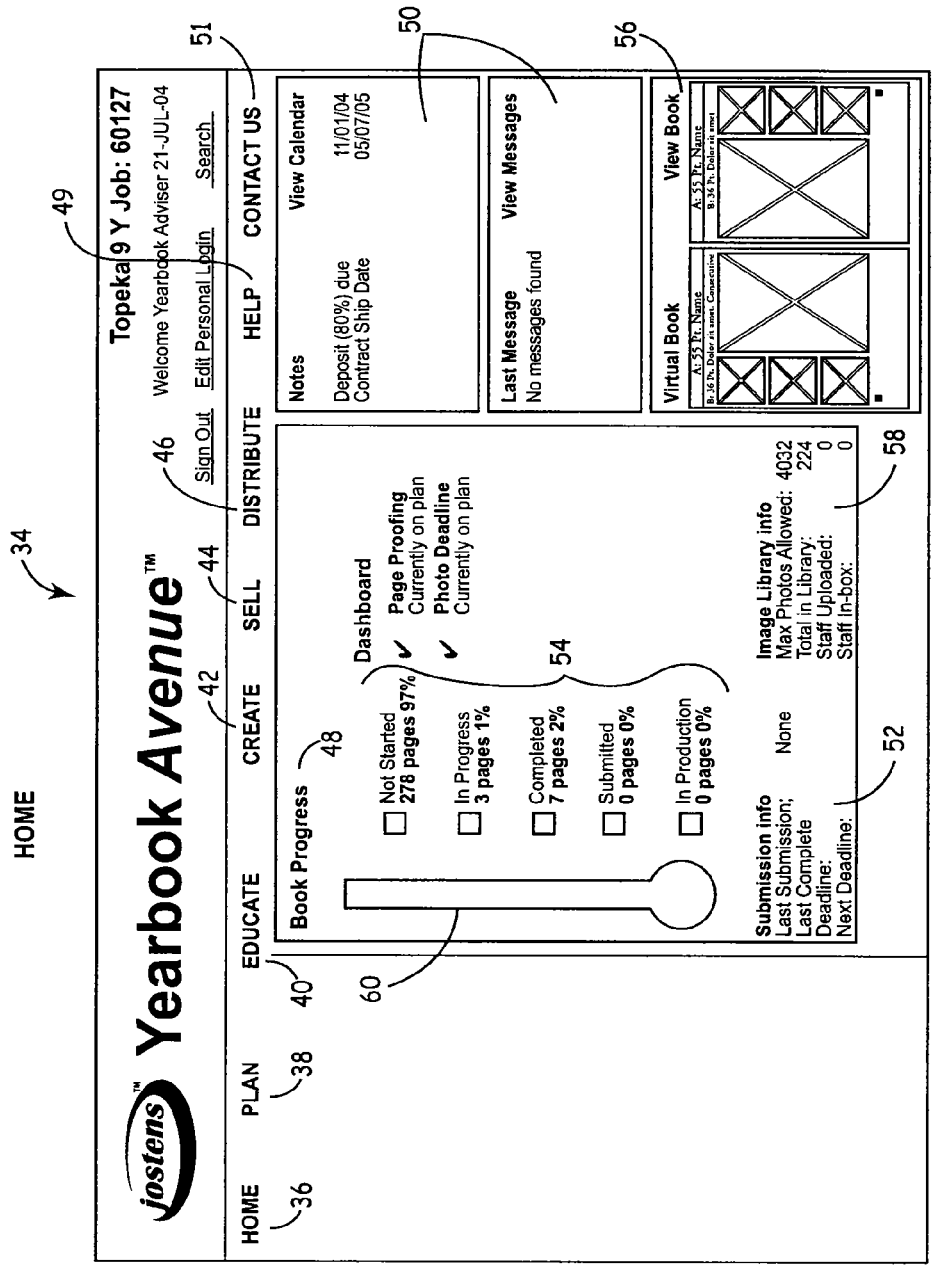
FIG. 3 illustrates a yearbook system home page in accordance with one embodiment of the present invention.

FIG. 3 illustrates a yearbook system home page 34 in accordance with one embodiment of the present invention. As shown, the yearbook system has navigational features to each of Home 36, Plan 38, Create 42, Educate 40, Sell 44, and Distribute 46. Other navigational features may be included to Supplies, Help, and Contact Us. Two types of information are provided within each of these categories: information specific to the school and informational content. Some of the informational content available is dynamic content that may be changed or updated. That information tends to be important for the type of information provided while the specifics of the information being less important.

The system home page 34 shown in FIG. 3 may be customized for each school using the yearbook system. Generally, the system home page provides a summary of the information specific to the school that may be otherwise accessed through the Home 36, Plan 38, Create 42, Educate 40, and Sell 44 tabs. In some embodiments, the home page 34 provides a snapshot view of the yearbook progress 48, notes and messages 50 regarding the yearbook, deadline status 52, submission information 54, and/or a virtual book access 56. Further, the system home page 34 may include Image Library Information 58 regarding photos submitted by the school or others such as the maximum number of photos allowed, the number of photos currently in the library, the number of photos uploaded by the staff, the number of photos currently used in the book, the number of photos currently in the staff in-box (prior to placement in the library), and other information. In some embodiments, one or more deadlines may be incorporated into the planning of the book and may be displayed on the system home page. Deadlines may include, for example, submission deadlines, order deadlines, delivery deadlines, and the like. The deadlines may include default deadlines which may be automatically set based on a typical progression of the yearbook creation process. Default deadlines may be manually adjusted by an authorized individual, such as an advisor or editor. The deadlines may further, or alternatively, include preliminary deadlines and final deadlines. Each preliminary deadline may be correspond with one or more final deadlines, and be assigned a date which is a predetermined period before its corresponding final deadline. The preliminary and final deadlines may be set by, for example, an advisors, system administrators, or the like. In one embodiment, if a deadline is a preliminary deadline, said deadline may not be indicated as such to selected users of the system such as, for example, yearbook staff.

A progress bar 60 or status indicator may be provided on the yearbook system home page 34 for giving a visual illustration of the progress of the yearbook creation. As shown, the progress bar 60 can illustrate the number and percentage of pages not yet started, the number and percentage of pages currently in progress, the number and percentage of pages completed, the number and percentage of pages submitted, and the number and percentage of pages in production. Thus, a school may visually track their progress in creating the yearbook. Generally, any suitable tool may be used to chart progress on the yearbook. In some embodiments, such tool may show completed pages. In some embodiments, the system may provide practice pages to schools. These practice pages generally may be set such that they do not affect the progress bar.

The yearbook creation summary page 34 may further provide a link to a Virtual book 56. Virtual books are described more fully in relation to FIG. 12. Briefly, the virtual book provides a flip-through virtual book of pages not started, currently in progress, completed, submitted, or in production. In some embodiments, one or more of the pages may be hidden such that the content of the page is not shown to all viewers of the virtual book.

As stated above, the yearbook system provides a tool for use from the start to the finish of the yearbook process. The yearbook system may be used for educating yearbook staff regarding the yearbook process, for planning the yearbook, for creating the yearbook, for facilitating external contributions to the yearbook, for selling the yearbook (including merchandising), and for distributing the yearbook. Each of these categories are discussed below. Some of these categories are discussed in relation to example web pages associated with the category. The web pages shown are illustrative of pages that may be used in a yearbook system in accordance with the present invention. However, each page, or a similar page, need not be used, and actual pages implemented may vary from those shown. Further, variations may be obvious to one skilled in the art and are intended to be included within the scope of the present invention.

Educate

The yearbook system home page 34 provides an Educate tab 40 for accessing Educate information. The Educate information includes information useful for a staff advisor to educate yearbook staff regarding the year book process and is generally informational content. Generally, the Educate information is dynamic content that may be changed or updated with some frequency. The Educate information may include publication information and classroom tools. Publication information may include recommended magazines and books devoted to the yearbook process. Classroom Tools may include teaching plans, teaching examples, and other tools useful for a staff advisor for teaching the yearbook process in a classroom setting.

The Educate tab may include an Ideas & Tips section. The Ideas & Tips section may have rotating information. The available information for rotation may vary depending on time of year. For example, at the beginning of the school year, available information may concentrate on planning of the yearbook.

Plan

The yearbook system home page 34 provides a Plan tab 38 for accessing Plan Information. The Plan information includes information and tools useful for yearbook staff to plan the yearbook. Generally, the Plan information includes both school specific information and informational content. The informational content is typically dynamic.

Example informational content provided within the Plan information are cover, theme, and segment ideas. Such ideas may provide examples of covers used, themes developed, and segments created in other yearbooks. These examples are not generally intended for copying but are instead intended to provide guidance to yearbook staff in creating their own cover, themes, and segments to customize their yearbook. Further, as will be described more fully below, templates may be provided or may be developed by a school for use by a yearbook staff. Such templates may be referred to as "click 'n go designs". Practice pages from current or previous years may be provided within the Plan information.

School specific information provided within the Plan information may include a planning ladder, fonts, styles, community photo site, staff management, school information, book configuration and key dates, and payment information. An indexing tool may be provided with the Plan information for indexing photos used in a book and for generating a coverage report, discussed below.

Figure 4:
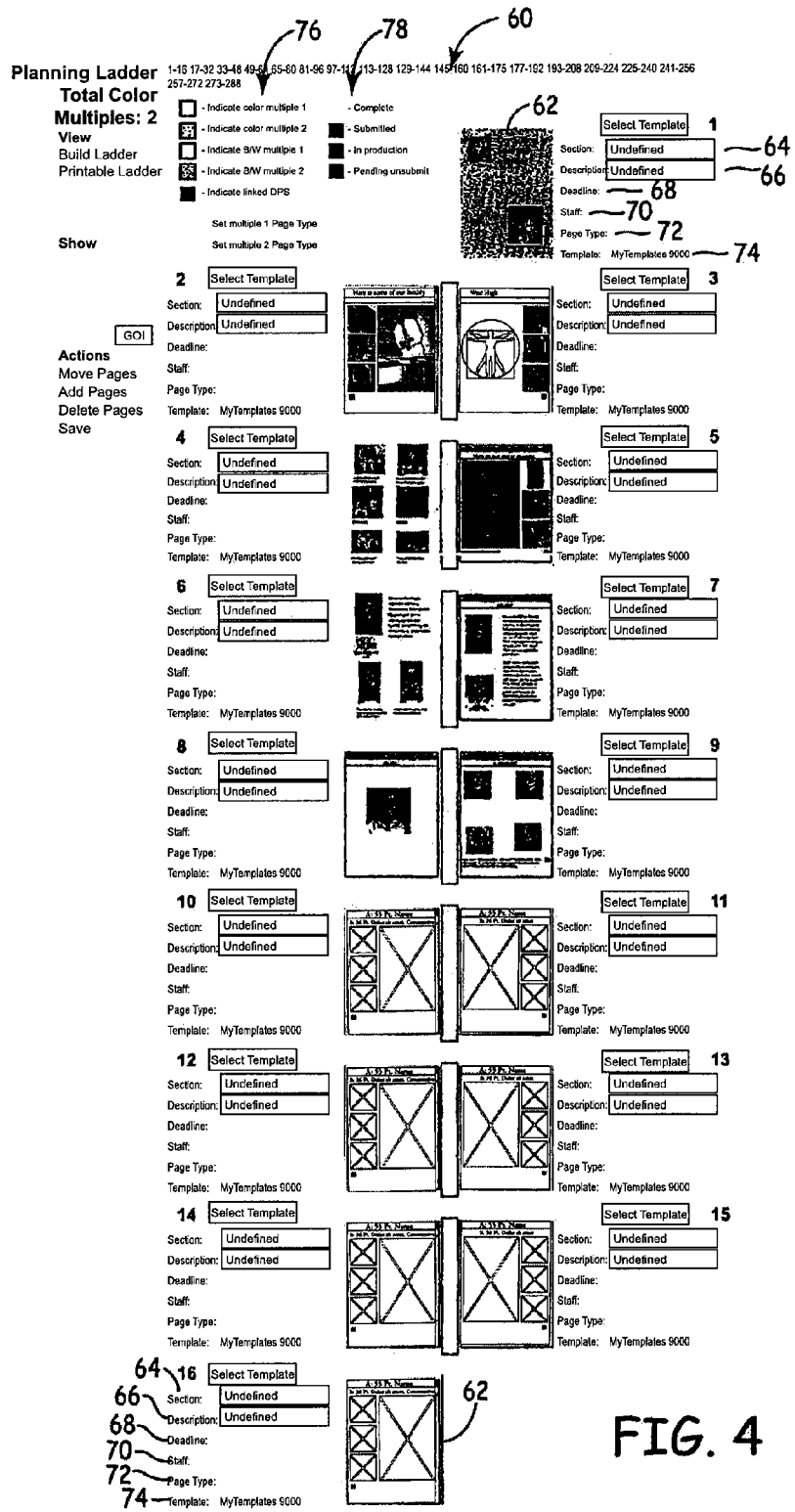
FIG. 4 illustrates a planning ladder in accordance with one embodiment of the present invention.

FIG. 4 illustrates a planning tool used to lay out the groundwork for creating the yearbook. The planning tool, which may hereinafter be referred to as Planning Ladder 60, may provide a thumbnail image 62 of each page (whether complete, partially created or still in template form). At the beginning of the planning stage, each page may be blank or may be in template form. Associated with each thumbnail page image may the following information: section 64, description 66, deadline 68, staff 70, page type 72, template 74, or other. One or more staff members may be associated with each page.

Thus, during planning, the yearbook staff may determine what section 64 of the yearbook the page will be in. Further, the planning ladder 60 visually indicates to the staff how many pages are allotted to each section. Similarly, the yearbook staff may assign a description 66 to the page within the section. Thus, for example, a section may be Fall Sports and a description of a page may be Girls Cross Country. The section 64 and description 66 may be entered by the staff. Each page may be given a template 74 for creating the page. In some embodiments, the exact template chosen may not be shown in the planning ladder—for example, a customized template designed using a desktop publishing application may not be scanned in and placed into the planning ladder. Alternately, however, such scanning and placement may be done. The system may include a tool for moving pages in the planning ladder, for inserting pages in the planning ladder, or for otherwise manipulating page placement on the planning ladder.

The system and method may include an outside contributor creation tool such as a parent ad creation tool. While this tool is specifically discussed with respect to content provided by a parent, the tool may further be used to facilitate content contribution by other members of the community. Thus, in certain embodiments, community members outside of the yearbook staff may add content to complete the yearbook.

In some embodiments, yearbook pages may be designated as "parent ads". The parent ads may be grouped together in a single section or may be spaced throughout the yearbook. The parent ad pages may not include significant information in the planning ladder and may be left substantially blank for customization by parents. Generally, schools may offer ad space for purchase by parents. The school may set up an offer designating, for example, possible sizes, prices, templates, etc. In some embodiments, the school may require parent ads to use a specific template. Generally, in one embodiment, parents may access a creation tool through a system website and create a parent ad for submission to the school or production facility. Creation may include picking an approved template, uploading digital images (or sending pictures to a production facility for scanning), placing the images on the template, and adding text. The production facility may place the parent ads in places designated as "parent ads" on the planning ladder. Alternatively, the school may place the parent ads in places designated as "parent ads" on the planning ladder. Further, in some embodiments, the school may retain the ability to format the parent ad. In some embodiments, design of parent ads may be done using a desktop publishing tool or other creation tool.

A deadline 68 may be assigned to each page for when the page is to be submitted. Generally, the pages are set into signatures, for example a new signature starts every sixteen pages. Each signature may have an associated deadline. Thus, the deadline 68 associated with the page may be that of the signature of which the page is a part. Staff information 70 may be entered such as the staff member or members currently designated for creating and editing the page. Staff information may be edited or changed throughout planning and creation of the yearbook. The Planning Ladder 68 permits visual identification of the pages assigned to each staff member and the deadlines of the pages assigned to each staff member.

Page type 70 may be used to indicate whether the page is color or black and white. Generally, a signature (or a multiple—half of a signature) is assigned as color or black and white. Within a color signature, an individual page may be designated as black and white. Color coding 76 may be used to indicate to what multiple the page belongs and whether that multiple is color or black and white. Typically, signatures are printed on the front and back of a single large piece of paper, with the paper then being cut and folded in a manner to create 16 consecutive pages. The pages printed on the front of the single large piece of paper are designated Multiple 1, the pages printed on the back of the single large piece of paper are designated Multiple 2. It may be useful to track to which multiple each page belongs so that, if 7 of 8 pages of Multiple 1 are submitted, the single non-submitted page may be priority flagged to be completed and submitted. Color coding may also be used to indicate whether the page is part of a double page spread (DPS). DPS pages are linked together such that one cannot be moved without the other being moved. Typically, DPS pages arise when a photo or theme crosses more than one page.

For easy reference during the creation process, color coding 78 may be used to indicate whether the page is complete, submitted, in production, or pending unsubmit. Within the Planning Ladder, pages may be moved, added, or deleted. The Planning Ladder sets the basis for the Build Ladder, described in relation to FIG. 18.

FIG. 5 illustrates a Fonts page 80 where the fonts for use in the creation of the yearbook may be selected. A font collection 82 is created on the fonts page listing what fonts 84 are used with what category 86. For example, it may be desirable for only one selected font to be used in headline category items. The font collection then lists what font may be used for headline category items. The font collection thus may be used to aid in providing consistency throughout the yearbook and limit the selection of fonts available. Fonts may include standard fonts available in desktop publishing and may also include special effects to the fonts—such as shadows, knock out or outline text, etc. The System may also enable full text rotation such that text inserted in a certain manner may be rotated.

FIG. 6 illustrates a Styles page 88. The styles page 88 may be used to set the desired font in all pages within the book. A default font may be set for the headline 90, sub-head 92, and caption or body categories 94 throughout the book. The categories may be determined based on the pt size of the font used. Thus, for example, all fonts of 24 pt or larger are determined as headlines, all fonts of 13-23 pt are determined as sub-head, and all fonts of 6-12 pt are determined as caption/body. Regardless of style setting, the font selection may be changed on any of the pages by selecting the text and editing it individually. Generally, the changed font is compliant with the font collection of the Fonts page, shown in FIG. 5.

FIG. 7 illustrates a Photo Submission Web Site 96. Schools may enable a photo submission web site 96 to permit others to submit photos for incorporation in the yearbook. For example, parents and other may upload photos to the site for the yearbook's staff to use. To enable such a site, the following information is entered: a start date 98 for availability of the site, an end date 100 for the site, a user id 102 for the site, a password 104 for the site, and a maximum number of images 106 that may be submitted. A location for the website (a web address) 108 is then assigned. Through the Yearbook Creation Home Page 34, staff may view how many images have been submitted. In one embodiment, the uploaded photos are placed on a quarantined site for viewing by the staff advisor to decide whether the photo is to be used. Once selected for use, the photo may be transferred to the Image Library. In some embodiments, parents and others may send photos to a production facility to be scanned in and uploaded to the system, via the Photo Submission Web Site 96 or other. In some embodiments, a user may designate a photo submitted to the photo submission web site as upload- or downloadable such that a further user may download the photo for printing. Thus, the photo submission web site may further operate as a photo sharing site.

FIG. 8 illustrates a Yearbook Staff maintenance screen 110. The screen 110 provides the ability to add new members to the yearbook staff by providing a name 112 and, optionally, an e-mail address 114 or other contact information. Further, the screen lists all current yearbook staff 116. The current staff may be updated or deleted. Members of the yearbook staff may be given access to the yearbook system. Some areas of the yearbook system web site may only be accessed by a set level of staff. For example, only the staff advisor may be given access to the Educate Information. Further, the information available in the dynamic content areas of the site may depend on the staff level. Similarly, the actions available may depend on the staff level. For example, only the staff advisor may be permitted to submit a page for production. Accordingly, in some embodiments, yearbook staff may be given specific roles with specific access. These roles may include advisor, editor, business manager, and others. Staff entered into the Yearbook Staff maintenance screen 110 may be designated as responsible staff members for pages in the Planning Ladder 60. Further, it may be possible to track what pages each staff member is responsible for by searching the staff member name.

FIG. 9 illustrates school information 118 accessed through the Plan information. The school information 118 includes the school name 120 and address 122 as well as contact information 124. A contact person is listed on the school information and includes the title, name, work phone, home phone, and email address of the contact person. Typically, this contact person is associated with the school, such as the yearbook advisor. This information may be used for correspondence between production and the school.

Figure 10:
FIG. 10 illustrates a yearbook configuration information and key dates page in accordance with one embodiment of the present invention.

FIG. 10 illustrates a yearbook configuration information and key dates page 126. The yearbook configuration information includes the number of pages 128 planned for the yearbook, the book size 130, and the number of copies 132 planned for production. The yearbook configuration information and key dates page 126 may further list yearbook options ordered 134. The key dates 136 may include, for example, the contract ship date. For planning purposes, deadline dates and submission dates may be assigned backwards from the ship date. In some embodiments, "dummy" deadlines may be included in the key dates.

FIG. 11 illustrates a Project Calendar 138. The project calendar 138 may be viewed in a daily view, weekly view, a monthly view, a semester view, or other. An action item 140 and associated notes 142 may be entered under each date.

FIG. 12 illustrates a Virtual Yearbook 144 discussed in relation to the yearbook system home page 34. The virtual book 144 may be accessed via the virtual yearbook 56 section on the yearbook system home page 34, from the planning ladder 60 of FIG. 4 or from the build ladder 146 of FIG. 13, discussed later. The virtual book provides a flip-through virtual book of all pages not started, currently in progress, completed, submitted, or in production. The Virtual Yearbook may not be available in all embodiments. In some embodiments, it may be possible to click through a page on the Virtual Yearbook 144 to access editing capabilities for the page. Thus, clicking on a page of the Virtual Yearbook may direct you to the build ladder or to the page of the build ladder.

Create

The yearbook system home page 34 provides a Create tab 42 for accessing Create information. The Create information includes information and tools useful for yearbook staff to create the yearbook. Generally, the Create information includes both school specific information and informational content. The informational content is typically dynamic.

Example informational content provided within the Create information are creation tools. Such tools may provide examples of the process of yearbook planning and creation.

School specific information provided within the Create information include a build ladder, a template builder, a template library, panel pages, an image library, photo coverage, an index, cover information, page submissions, messages, a complete page grid, and a summary report.

Figure 13:
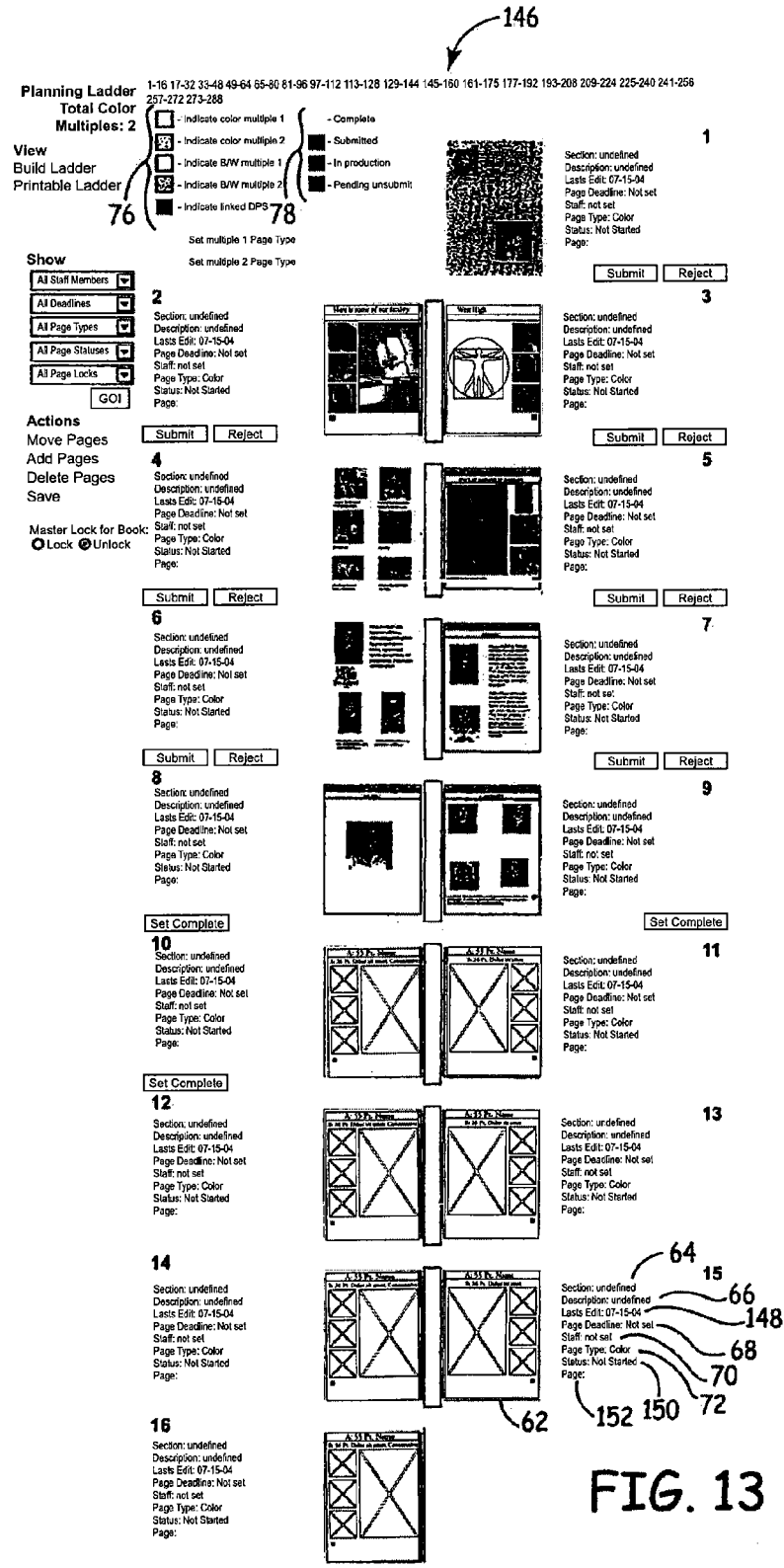
FIG. 13 illustrates a build ladder in accordance with one embodiment of the present invention.

FIG. 13 illustrates a Build Ladder 146 in accordance with one embodiment of the invention. The basis for the Build Ladder 146 is set in the Planning Ladder 60 (discussed previously in relation to FIG. 4). The Build Ladder 146 may provide a visual representation of each page, such as by providing a thumbnail image 62 of each page (whether complete, partially created or still in template form). Associated with each thumbnail page image is information such as: section 64, description 66, last edit 148, page deadline 68, staff 70, page type 72, status 150 and page 152. The section 64, description 66, page deadline 68, staff 70, and page type 72 are described in relation to FIG. 4. Further, color coding 76 for DPS, multiple 1 or 2, and color or black and white is as described in relation to FIG. 4. In one embodiment, the Build Ladder 146 may be dynamic (i.e., the building ladder is updated as the pages are modified/edited). Last edit 148 indicates when the page was last modified/edited. Status 150 indicates the current status of the page, for example, complete, in progress, or not started. As with FIG. 4, color coding 78 may be used to indicate whether the page is complete, submitted, in production, or pending unsubmit. Other information may further be associated with each page in further embodiments.

A submit function 151 and/or a reject function 153 may be provided with the Build Ladder 146. The submit function 151 and reject function 153 may be provided as icons/buttons associated with one or more pages of the Building Ladder 146. In one embodiment, either or both of the submit function 151 and reject function 153 may be available for selected users only, such as advisors or editors.

A Page Mover tool may be provided with the Build Ladder 146 and/or the Planning Ladder 60. The Page Mover tool can facilitate moving of pages, swapping of pages, etc. such that users are easily able to modify flow of the yearbook. In some embodiment, the Page Mover may enable drag and drop functionality such that a page may be dragged and dropped into a new position, bumping subsequent pages accordingly. The Page Mover tool may also enable insertion of pages. The Page Mover tool thus may prompt a user to indicate whether a page should be inserted before or after a certain position in the book and may prompt the user how many pages are to be so inserted.

In some embodiments, a build ladder 146 showing partially created or completed pages may not be available. For example, a school using a desk top publishing application may not continually scan pages during the creation process for placement in the Build Ladder 146. Thus, only a template or blank page may be shown. Further, no build ladder 146 may be available in a desktop creation, or alternative embodiment, process. Alternately, a scanning and placement process may be used to periodically scan partially created or complete pages of a desk top publishing application for placement in the Build Ladder 146.

In embodiments showing created or completed pages, the build ladder may illustrate photos and images in high resolution or low resolution based on a user's or school's preferences. Thus, for example, where the user is accessing the system in a high connectivity environment, the build ladder may illustrate photos and images in high resolution. In contrast, where the user is accessing the system in a low connectivity environment, the build ladder may illustrate photos and images in low resolution.

Figure 14:
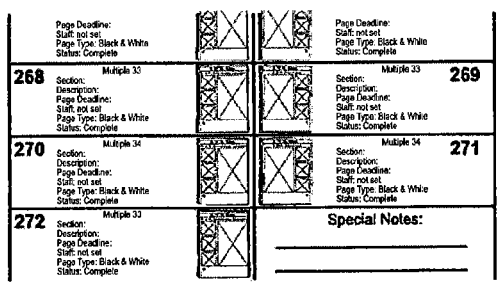
FIG. 14 illustrates a printable ladder in accordance with one embodiment of the present invention.

A Printable Ladder 154 may be accessed through either the Planning Ladder 60 or the Build Ladder 146 and is shown in FIG. 14. Like the Planning Ladder 60 and the Build Ladder 146, the Printable Ladder 154 provides a thumbnail image 62 of each page (whether complete, partially created, or still in template form). Associated with each thumbnail 62 is information such as: section 64, description 66, page deadline 68, staff 70, page type 72, and status 150. Also listed is to which multiple 156 the page belongs. Within the Printable Ladder 154, the pages may be divided into signatures 158. Thus, for example, the first sixteen pages may be associated with Signature 1, the next sixteen pages may be associated with Signature 2, etc. Spaces 160 for notes may be given such that the users or staff may write notes into the printed Printable Ladder 154.

Figure 15:
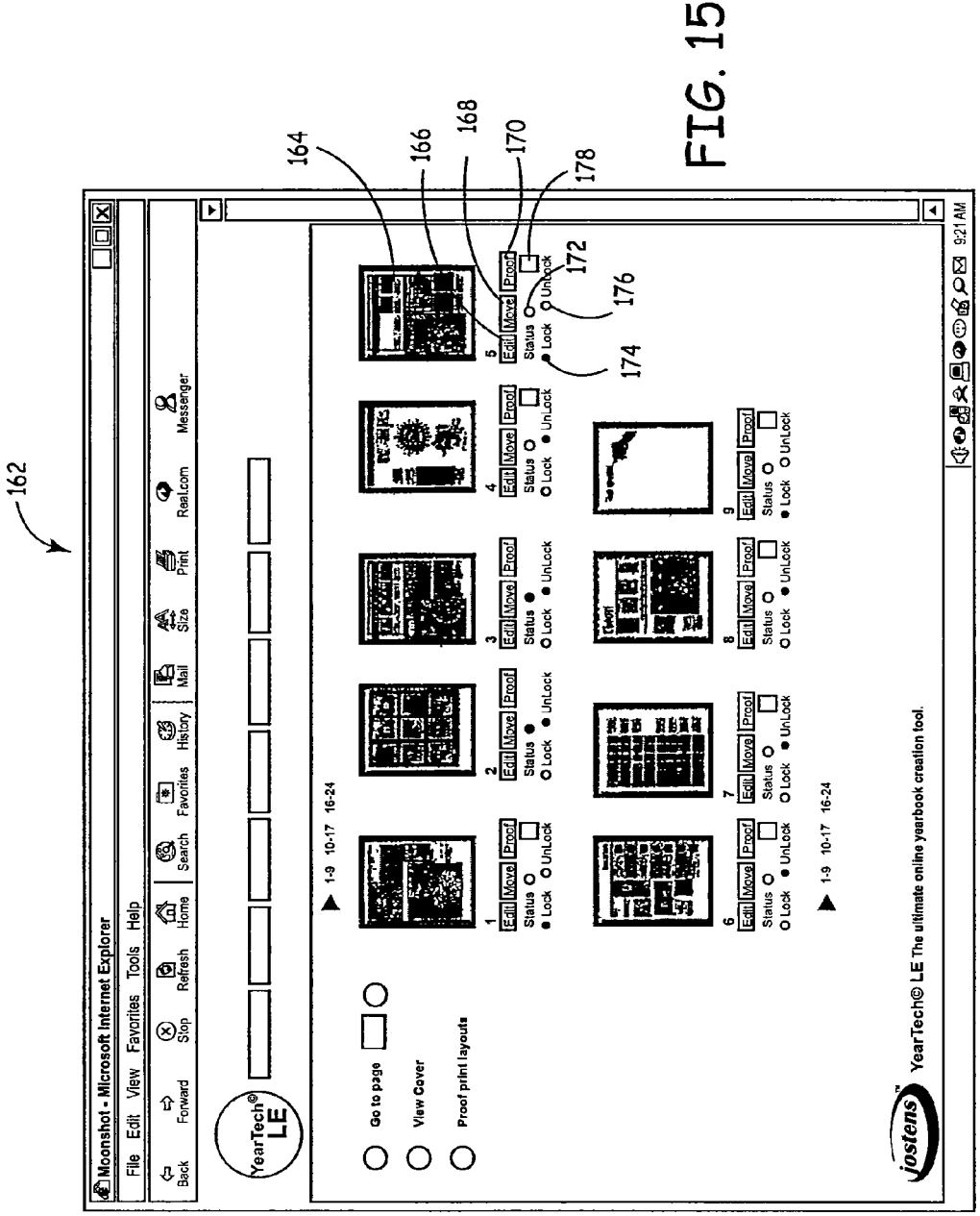
FIG. 15 illustrates a page preview screen in accordance with one embodiment of the present invention.

An alternate embodiment of a screen showing some of the information from the Build Ladder is shown in FIG. 15. FIG. 15 illustrates a page preview screen 162 showing thumbnails 164 of several designed pages. As shown, several thumbnails 164 may be shown on each screen 162. Options may be provided associated with each page, for example under each thumbnail image, allowing the user to choose to edit 166 the page, move 168 the page, or proof 170 the page. Other options may be provided as desired. A status indicator 172 may be provided associated with each page, for example under each thumbnail image 164. The status indicator 172 may change colors when the page has acquired a certain status. For example, if the status indicator is red, it indicates that the page has been submitted to the production facility and the page may be viewed but not edited. Lock and unlock buttons 174 and 176 may also be provided associated with each thumbnail 164. These buttons allow an advisor to lock or unlock pages. When a page is locked, a graphic of a lock 178 appears. A locked page may not be edited unless unlocked. In some embodiments, particular elements on a page may be locked. Submitted pages may not be locked or unlocked as submitted pages may not be edited regardless of lock or unlocked status. Lock and unlock options need not be provided. In some embodiments, a page may be "hidden" from view. Thus, for example, if a page is dedicated to a memorial, an advisor may hide the page from view from any user to keep the memorial page confidential until publication.

Figure 16:
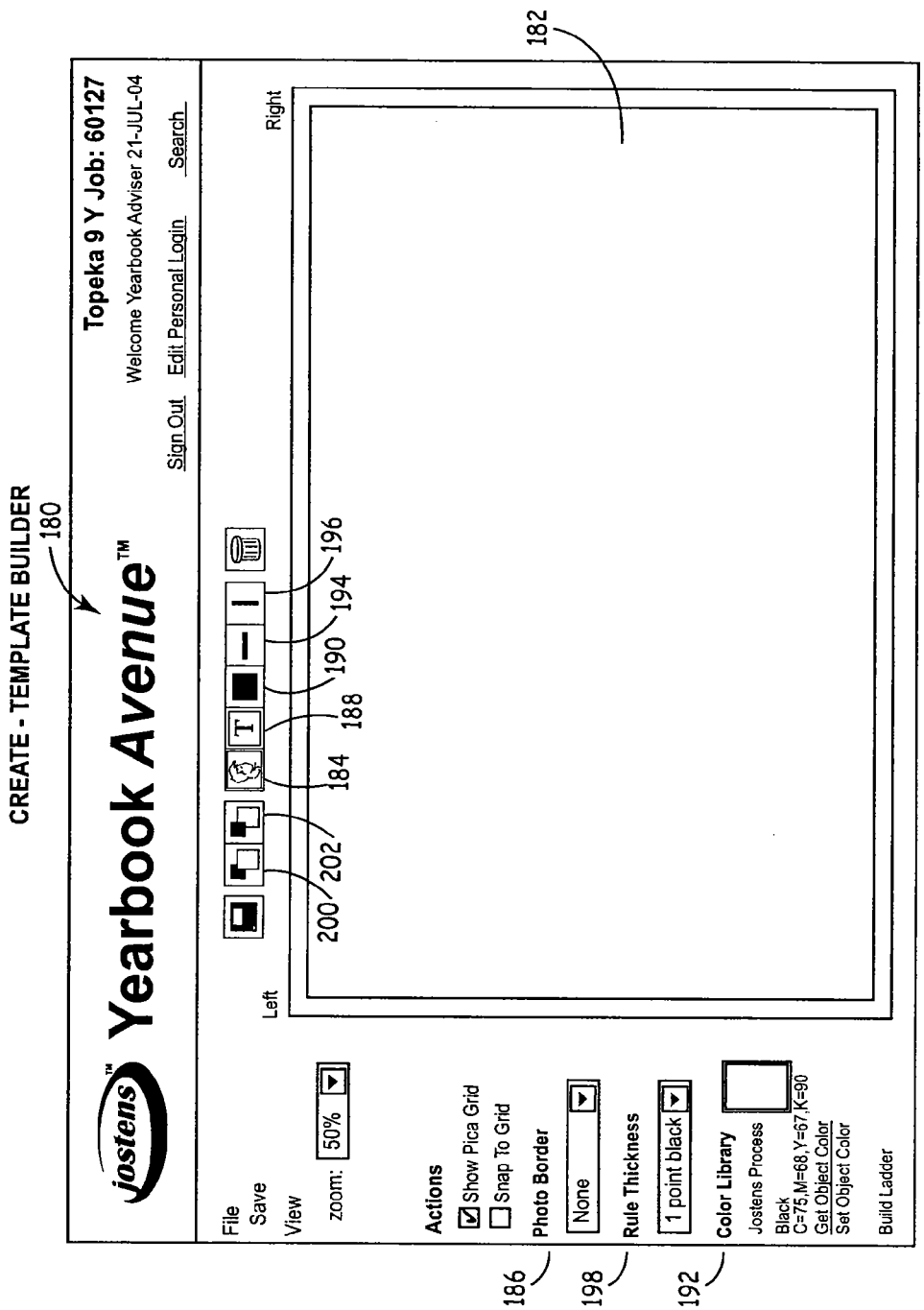
FIG. 16 illustrates a template builder page in accordance with one embodiment of the present invention.

FIG. 16 illustrates a Template Builder 180 in accordance with one embodiment of the present invention. The template builder 180 provides a blank template 182 that may be customized by the user. Photo boxes may be added using the add photo box button 184. The photo boxes may include photo shapes such as circle, star, heart, octagon, square, rectangle, or other. In some embodiments, an existing photo box may be modified to a new shape. A photo border may be added using the drop down menu 186. Text boxes may be added using the add text box button 188. Color boxes may be added using the add color box button 190. The color may be selected from the color library 192. Added boxes may be moved and resized by clicking on the added box. Horizontal rules and vertical rules may be added by clicking on the add horizontal rule button 194 and the add vertical rule button 196 respectively. The rule thickness may be edited by using the drop down menu 198. Send backward and Bring forward buttons 200 and 202, respectively, may be provided for placing a picture box and/or text box in front of or behind another picture box or text box. In some embodiments, image boxes and text boxes may be freely rotatable, resizeable, and rescalable. In some embodiments, rotation may be in 15 degree increments. The text boxes and image boxes may further be moved on the page. The template may be saved as a specific template type for future use.

Figure 17:
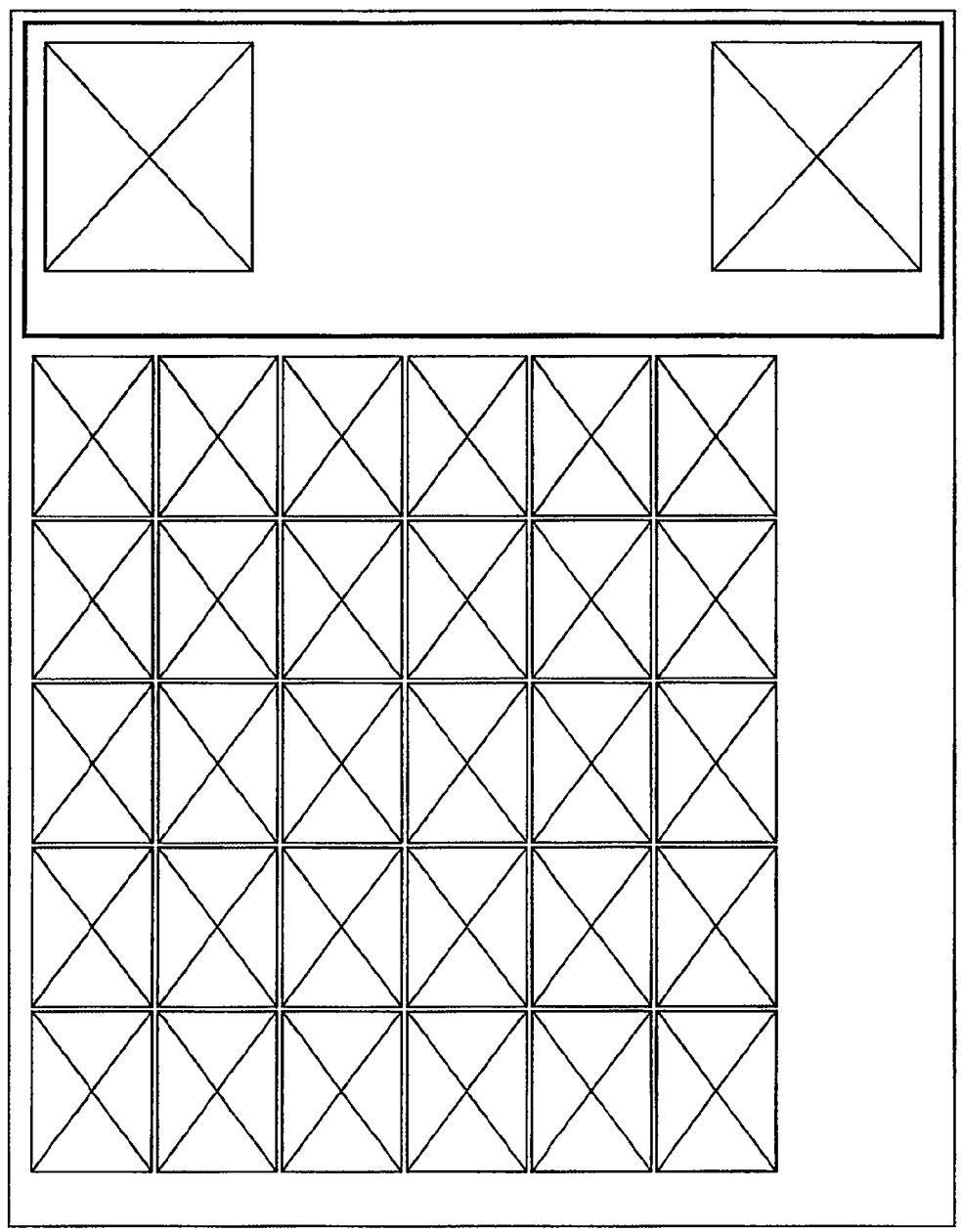
FIG. 17 illustrates a portrait page template in accordance with one embodiment of the present invention.
Figure 18:
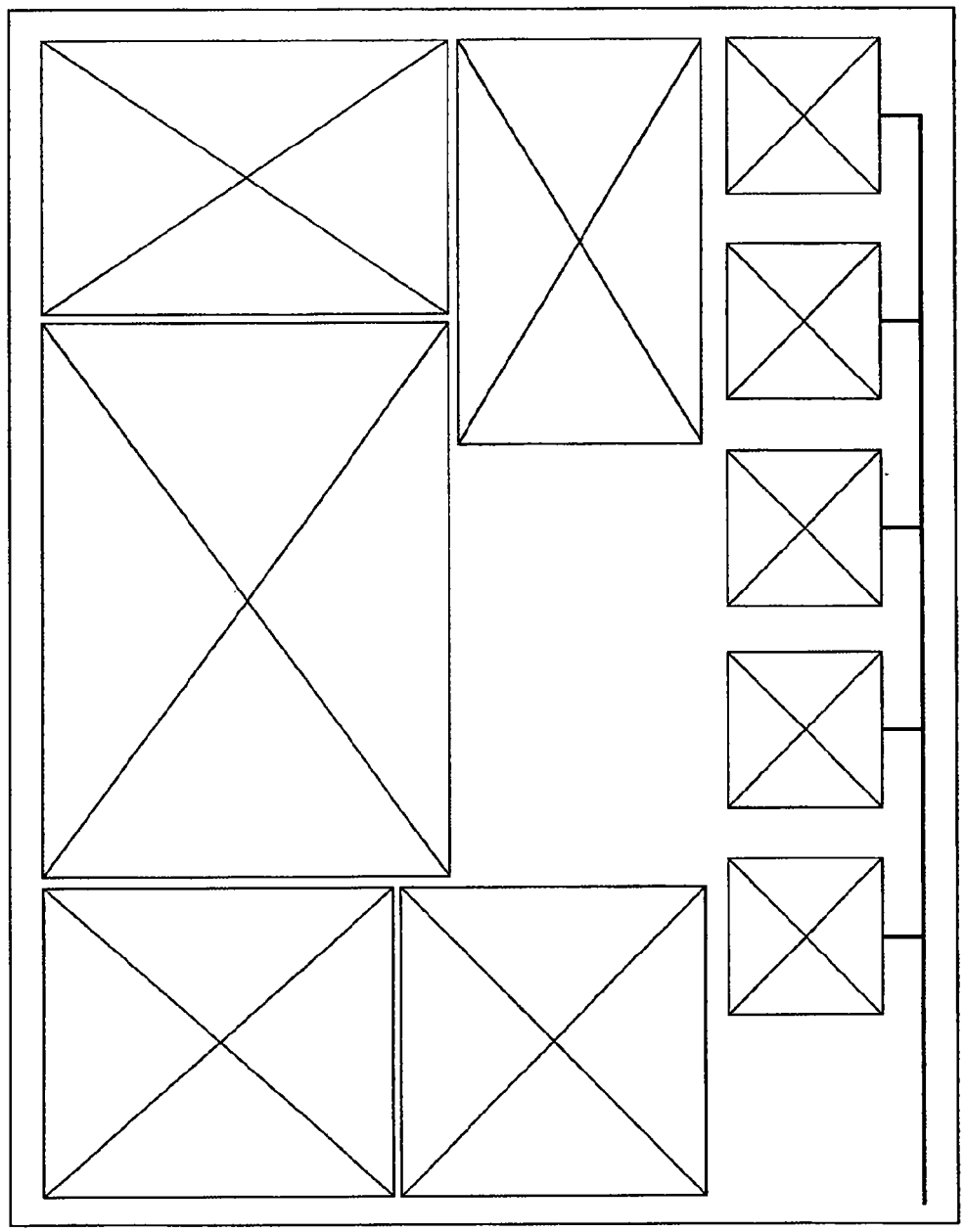
FIG. 18 illustrates an activity page template in accordance with one embodiment of the present invention.
Figure 19:
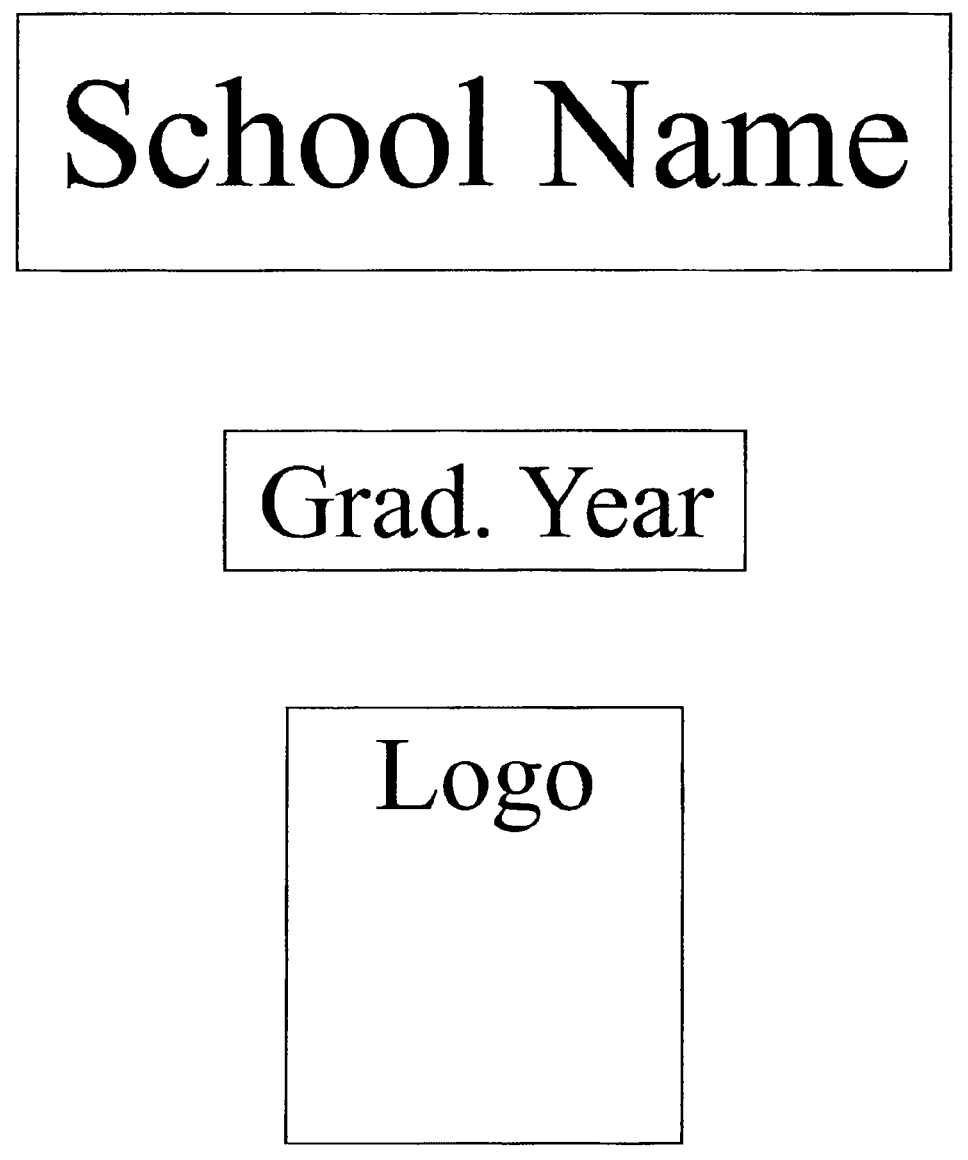

In addition to fully customized templates, standard templates may be provided for user customization, shown in FIGS. 17-19. FIG. 17 illustrates a portrait page template 204. FIG. 18 illustrates an activity page template 206. FIG. 19 illustrates a cover template 208. Of course, the templates shown in FIG. 17-19 are only examples. A wide variation of templates may be provided and used. In some embodiments, templates created or customized by a school may be saved from year to year such that yearbook staff need only customize the template with new photos or text.

In some embodiments, "click 'n go" templates may be provided. These templates may be a fully designed template wherein yearbook staff need only add pictures and/or text, may be partially created templates that require further customization, or may be a fully designed template that is customized and changed. For example, each template may be customized by adding elements such as headings, photo boxes, quarter pages, or half pages, and thus creating a custom template.

In yet further embodiments, templates may be provided as part of a Template Exchange. The Yearbook System provided herein may be an online system. Each school's portion of the system may communicate with a main system database. The main system database may include templates shared by a plurality of schools. This portion of the database may be termed a Template Exchange Folder. In some embodiments, the Template Exchange Folder may include one or more categories. For example, the Template Exchange Folder may include "Sports Templates", "Prom Templates", etc. Generally, the Template Exchange Folder may show sample templates without inclusion of actual text or photos—thus showing text boxes or photo boxes. The Template Exchange Folder may show templates in any order, such as in order of chronology by posting, in order of most popular, etc. In some embodiments, the Template Exchange Folder may only share templates of schools in like regions, or like categories (e.g., a religious school), or other. The Template Exchange Folder fosters sharing between schools and creativity of yearbook staff by facilitating publishing of work to others.

Generally, to complete a yearbook page, the staff member chooses a template, customizes the template, and adds photos and/or text to the template. Grids may be provided on the template to facilitate alignment during customization of the template. Thus, for example, a grid may be placed on the template and, when a user adds a photo box, the photo box may be "snapped to" alignment on the grid.

A Panel Pages screen 210 is shown in FIG. 20. Panel pages are portrait pages and have the student photos therein. In designing portrait pages, the user is prompted to choose the portrait size. Panel pages are pages in the yearbook devoted to student portraits. Typically, a photographer takes pictures of the students and loads the pictures as digital images onto a CD. The CD is shipped to the production facility and the production facility loads the images into categories. For example, all $10^{th}$ grade student photos are loaded into a $10^{th}$ grade category. Once the images are loaded by production, the school may proof the images and loading for accuracy. For example, duplicate images may be deleted, images in the wrong category may be moved, images of students whose picture was not originally submitted may be added, and student names associated with each photo may be checked. The photos are inserted into a panel page (or portrait page) template chosen by the school. The photos are loaded alphabetically as they would appear in the yearbook. Generally, the process of loading the images into the panel page is an automatic process and is driven by the template chosen by the school. Typically, the school is given a choice of pre-designed templates for selection as the panel pages template. Alternately, the school may design a customized template and then manually place each photo and text on the template or select flow of photos into the customized template. Accordingly, in some embodiments, the System may facilitate custom panel flow.

As shown in FIG. 20, the panel pages screen 210 shows a color-coded status 212 of each page, whether not started, in process, completed page, submitted page, in production, or locked. To place portraits, the user clicks on the page icon they would like the selected category to start on.

Figure 21:
FIG. 21 illustrates a portrait page editing screen in accordance with one embodiment of the present invention.

In an alternate embodiment, shown in FIG. 21, the user may be given several options during selection of a panel page template. The user may choose the portrait window shape 214, for example oval or rectangle. The user may choose where the names are to be placed 216—along the outside edge or below the portraits. The user may further choose the photo size 218 (small, medium large). In an alternate embodiment, the user may choose whether to include the minimum number of portraits per page, the normal number of portraits per page, or the maximum number of portraits per page. Thus, the user is given some flexibility in determining the total number of pages dedicated to portraits. The user designates the category 220 assigned to each page, for example, $10^{th}$ grade.

In some embodiments, the yearbook system may include a customizable spell check feature. Using this feature, a user may add custom words. This may be used, for example, to add student names. By adding student names to the custom spell check feature, a school may decrease the likelihood of a student's name being spell check corrected to a different, and possibly embarrassing, word. In various embodiments, the System may be provided with a spell check dictionary customized for the location of the school. For example, the System may be provided with an American English spell check dictionary for US schools and a UK English spell check dictionary for non-US schools.

Figure 22:
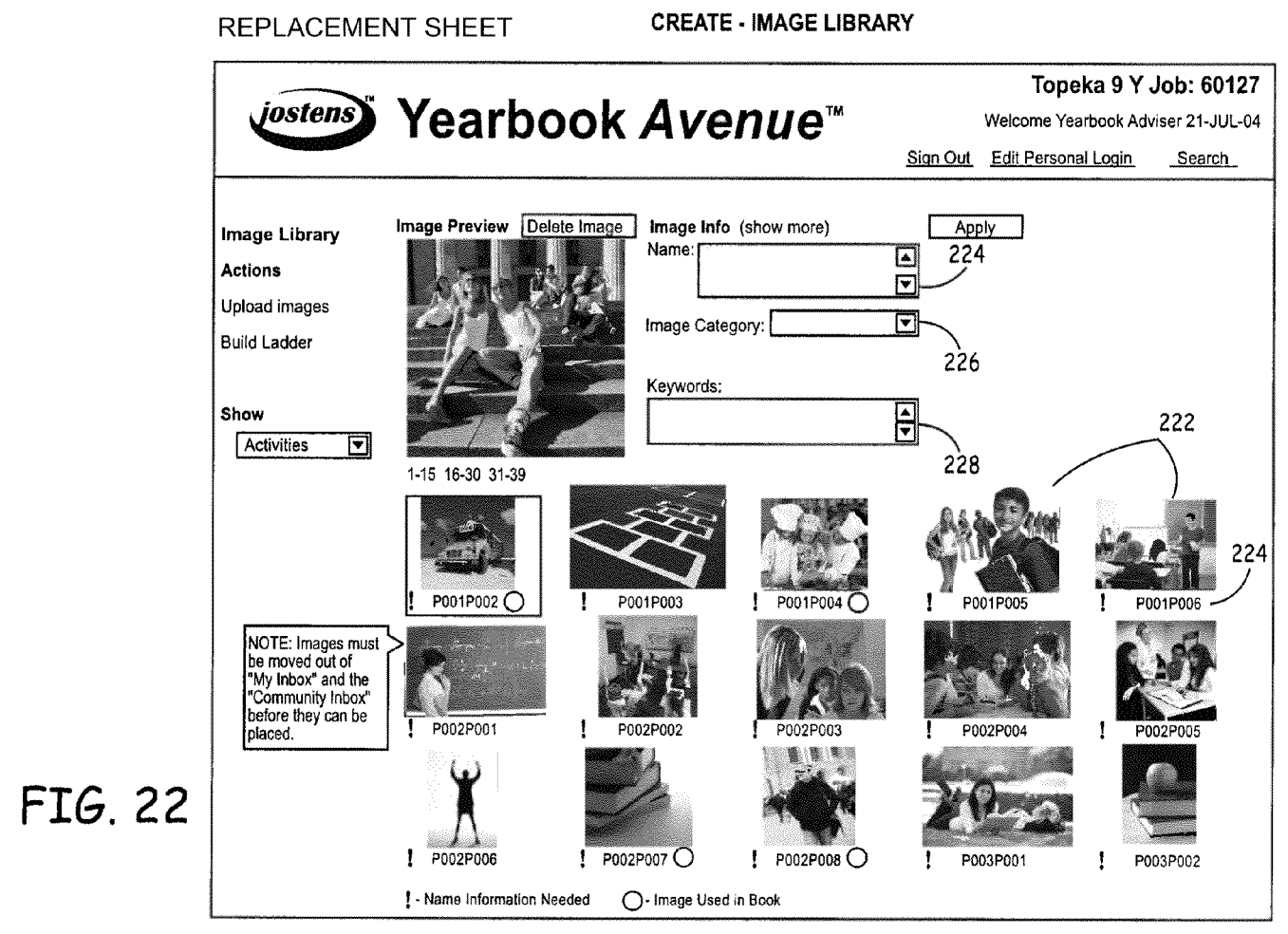

An Image Library page is illustrated in FIG. 22. In various embodiments, the Image Library may be provided with sub-categories. For example, the Image Library may be divided into sub-category folders such as Sports, Theater, Rallies, etc. Thumbnails 222 are provided of each of the images within the library. Photos may be uploaded to the Image Library by yearbook staff or outside contributors such as students or parents. The Image Library may also be configured such that photos may be downloaded from the Image Library for purchase or for further photo manipulation (and subsequent re-uploading). In certain embodiments, images may be auto-enhanced. Thus, uploaded images may be assessed based on histogram, color, and saturation and adjusted to best fit for its intended use. Auto-enhancement may be done at the time of uploading or at the time of placement in the book. In some embodiments, the production facility may auto-enhance images based on the printing equipment to be used to produce the yearbook. This may be referred to as post-production enhancement.

The System may be provided with photo manipulation capabilities. Photo manipulation capabilities may include color/image management enhancements. Incorporation of photo capabilities into the system facilitates start to finish yearbook creation using the system. Photo manipulation capabilities may include cutting out backgrounds, opacity manipulation, sepia tones, black and white tones, colorizing, adding an outer glow, red eye removal, etc. Cutting out backgrounds enables a user to cut around a feature of an image and remove the background. Opacity manipulation enables a user to modify an image from opaque to transparent such that it can overlay other features. Sepia tones, black and white tones, and colorizing enable manipulation of colors of the image.

Each uploaded image may be given a name 224, associated with an image category 226 and various keywords 228. For example, the names of each student appearing in the each photo may be listed associated with each photo. Other information such as keywords may further be associated with each photo. Thus, for example, a photo may be tagged with "girls cross country" to indicate that the photo is a photo of the girls cross country team. Thus, in some embodiments, the images may be searchable. In some embodiments, image categories and information may be hidden, based on user preferences or settings.

Image tags may be used to ascertain how many times a photo having that tag appears in the book. Images in the image library may be used during yearbook creation. Images must be moved from a staff inbox or community inbox before they may be used. Images may be uploaded to the image library. The image library thus provides a central repository for images that may be used in the yearbook. A status marker may be provided associated with each image, indicating whether a picture has been placed in the yearbook. Once a decision is reached that an image will not be used, it may be deleted from the image library. Deleted images may be stored at a production facility for easy recall.

In one embodiment, the System may include an image sharing tool configured to facilitate sharing of the images to individuals or other websites. The image sharing tool may be configured to allow for transfer of images in low or high resolution. The image sharing tool may be further configured to provide a link to the Photo Submission Web Site 96. The image sharing tool may be accessible to, for example, staff members, community members, or other third party content contributors.

In various embodiment, the System may be further configured to provide access to the yearbook and/or portions of the yearbook content to community members or other third party content contributors. For example, either or both of the image library and the virtual book may be provided to community members or other third party content contributors.

In some embodiments, certain images may be archived for use in future yearbooks. For example, business advertisements, pictures of the school, pictures of teachers or other school employees, etc. may be archived.

A photo coverage page may be provided as part of the Create information. The photo coverage page draws on the information associated with the image from the photo library to determine which students appear in which photos currently being used in the yearbook. Further, an index page may be provided listing each student and the page number on which they appear. Names may be automatically culled from portrait pages to create a database of students against whom coverage should be checked. Thus, the photo coverage page and the index page may be used to track appearance of students in the yearbook. A tracking system and/or alert system may be associated with the photo coverage page. Thus, for example, yearbook staff may input that each student should appear in the yearbook three times. The tracking system monitors coverage pursuant to the photo coverage page and may email tracking information to yearbook staff. As the yearbook nears completion, for example when it is 80% complete, the alert system may send out alerts that certain students appear fewer than the selected number of times. In some embodiments, the coverage report may only show students who appear in the book fewer than the designated number. The coverage report may further have logic to highlight entries for similar names, for example, "Arthur Mills" and "Art Mills".

In some embodiments, the photo coverage tracking system may be linked to a purchase tracking system. Thus, the System may track students who appear in the book a certain number of times and who have not purchased a yearbook. The System then may generate a customized notification, such as an email, letting the student know that they appear in the yearbook and soliciting them to purchase the yearbook. In some embodiments, the customized notification may include details about the student's appearance in the yearbook such as by incorporating one or all of the images featuring the student.

Figure 23:
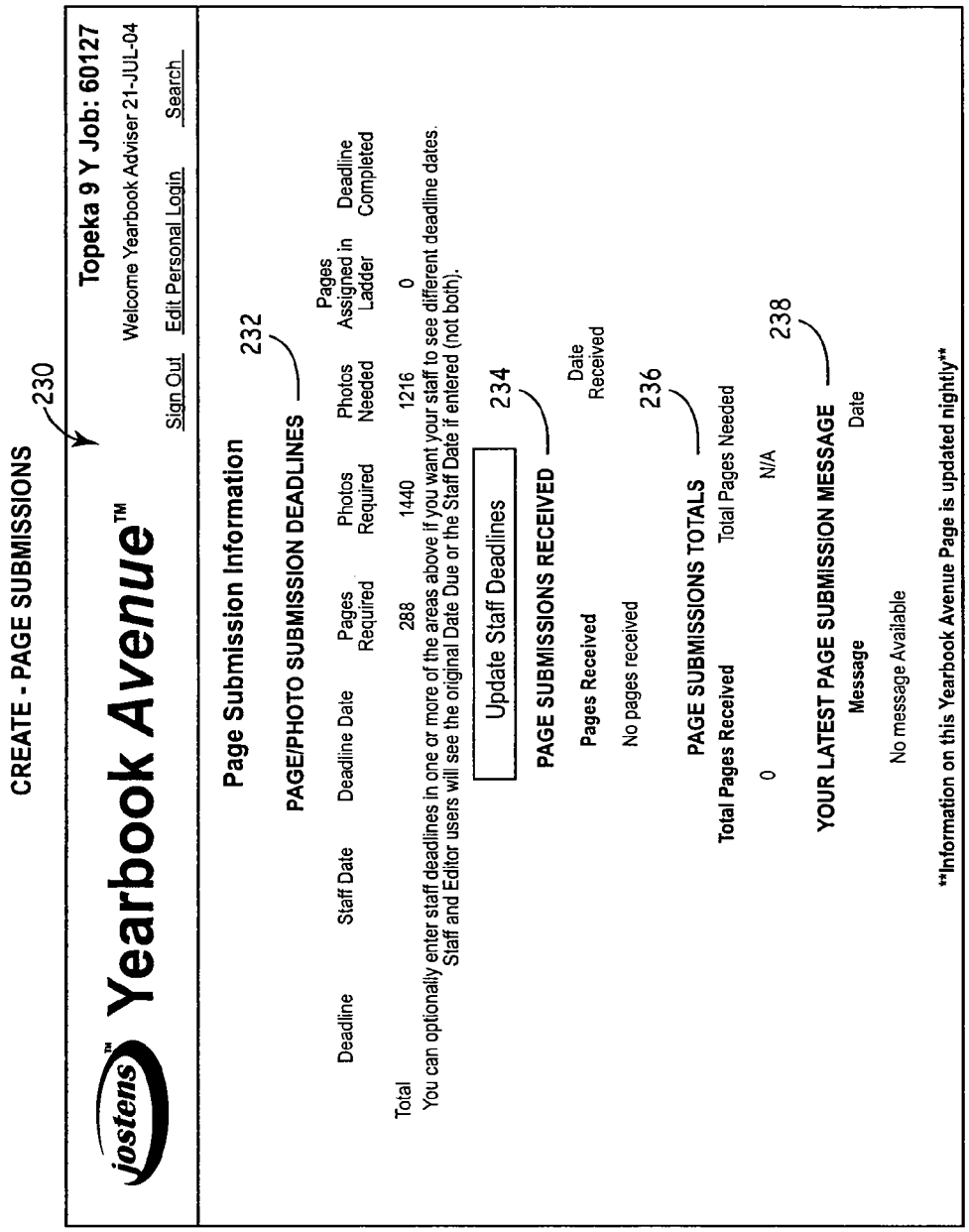
FIG. 23 illustrates a photo submissions information page in accordance with one embodiment of the present invention.

A Photo Submissions Information page 230 is illustrated in FIG. 23. As shown, the photo submissions information page 230 may include information on the page/photo submission deadlines 232, the page submissions received 234, the page submission totals 236, and the latest page submission message 236. In addition to the deadline date for the page/photo submission deadlines, the number of pages required, the number of photos required, the numbers of photos still needed, and the pages assigned in the ladder (planning ladder or build ladder) may be listed.

Pre-licensed images and news items may also be provided within the Create information. For example, images or news stories from significant world events may be provided available for use by the school in the yearbook. Thus, for example, during an election year, images may be provided of the candidates or of the campaigns. As another example, if the school is located in an area where an earthquake had occurred, images may be provided of the aftermath of the earthquake. Similarly, trademarks or copyrights may be pre-licensed and available for use by the school. For example, particular copyrighted or trademarked graphics may be made available. By having access to pre-licensed images, the school can include a wide array of current events information without having to individually seek out permission.

Using the yearbook system, a custom cover may be designed. Numerous possible combinations of cover workflows include silkscreen, art, foil, embossing, graining, matelay, casemaking, die cutting, lamination, handwork and overtone. Custom cover artwork may be submitted by the school, scanned at the production facility, and made available on the yearbook server. A template for a custom cover may include one large image and no text. Alternately, a stock cover with school personalization, such as school name and mascot, may be used.

Figure 24A:
FIG. 24A illustrates a cover information page in accordance with one embodiment of the present invention.

A cover information page 238, as shown in FIG. 24A, may be provided. The cover information includes both information about the cover 240 and about the endsheets 242. The cover information 240 includes the kind of cover and the trim size.

In some embodiments, the endsheets may be custom endsheets. The endsheets are the pages that hold the book block to the book cover. The endsheets appear as sheets but generally have a different size and may be treated differently from other sheets in the book. In some embodiments, the endsheets may be customized. The endsheet information 244 includes the front paper, the front color 1, the front color 2, the back paper, the back color 1, the back color 2, whether a special design was used, whether the front and back endsheets are the same, whether the endsheet has printing on the pages, whether the endsheet is being proofed, the date the proof was sent, and the date the proof was returned.

FIG. 24B illustrates a Messages page 246. Typically, messages are to the advisor and relate to key events. The messages may be automated, such as acknowledging receipt of a submission. Alternately, the messages may have in depth information such as deficiencies or problems with a submission. The messages page 246 facilitates communication to the advisor during yearbook creation.

In alternative embodiments, yearbook staff may leave "notes" to one another. These notes are tabs that may be placed on the shared document and including information such as name of poster, note, time posted, etc. The note may be a non-printable element. The notes facilitate communication and collaboration between yearbook staff. In some embodiments, only the poster of the note may remove the note. In other embodiments, the note may have a designated addressee and only the addressee or poster may remove the note. In yet other embodiments, anyone with access to the page on which the note is placed may remove the note.

In further embodiments, the System may be provided with a live chat feature such that chat may be enabled between any staff members online at a given time. In various embodiments, the chat feature may facilitate individual chat or global chat. For example, in individual chat, a staff member may individually instant message (IM) another chat message. In some embodiments, the IM may create a chat window on the screens of the individual staff members. In global chat, a staff member may globally message any online members. In some embodiments, the global message may create a chat window on the screens of all staff members.

Page Creation

As previously described, to create a yearbook, the yearbook staff begins by using the planning ladder. Using the planning ladder, the yearbook staff designates certain pages or portion of the books as intended for certain categories. For example, the staff may designate certain pages as devoted to sports, certain pages as devoted to community involvement, and certain pages as panel pages. Staff members may be assigned to certain pages.

Figure 25:
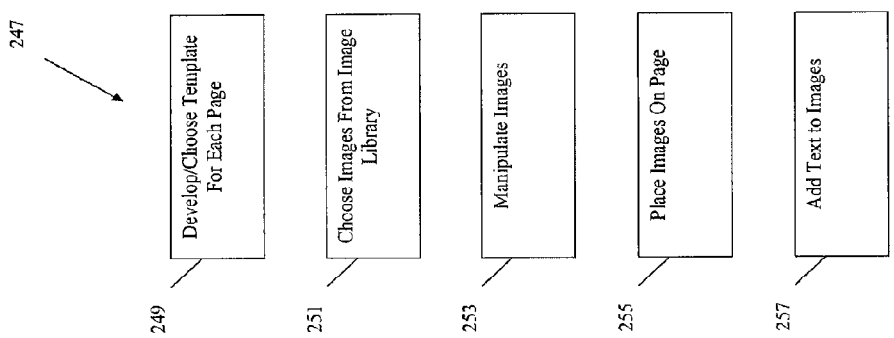
FIG. 25 illustrates a process flow of a staff member customizing a page in accordance with one embodiment of the present invention.

Each staff member then may take control of their assigned pages. FIG. 25 illustrates a process flow 247 of a staff member customizing a page in accordance with one embodiment of the present invention. The staff member may develop or choose a template for each of their pages 249. In other embodiments, these types of content may be chosen or modified during customization of the page. After a template has been associated with the page, the staff member can customize the page with content. Customization of the page, or page creation, may be done using a designer provided on the System. The designer may incorporate elements of desktop publishing as well as customization elements of the System. The designer generally permits manipulation of the page in a user-friendly manner.

Content placed on the page may automatically take on the visual elements associated with that page, for example by the template of the page. For example, visual elements associated with the template may include font type, size, and color for text. Thus, any text added to the page may have that font type, size, and color. In some embodiments, to change the visual elements, the change must be universal to the page. In other embodiments, a user may change visual elements associated with a single portion, or generally less than all of the portions, of the page. In an alternative embodiment, the user may further enter desired visual elements such as colors, fonts, illustrations, covers, and other visual elements. These desired visual elements may then be incorporated into the page.

Customizing the page with content may include choosing images from the image library 251, manipulating the images 253, and placing the images on the page 255. Manipulating the images may include, for example, colorizing the images, cropping the images, or otherwise using the image manipulation tools provided with the system.

In some embodiments, the System may facilitate adding further image boxes to a template or page. The staff member can select a shape for the image box, a border for the image box, or other. The staff member can size, rotate, or move the image box. After placement of the image box, the staff member can place an image from the Image Library into the image box. The image can be rotated, cropped, panned, have advanced styling features applied, or otherwise edited.

Customizing the page with content may further include adding text to the page 257. Adding text may be done by adding a text box and flowing text into the text box. In some embodiments, the text box may be designated as having one or more columns and the text may automatically flow in such columns. In some embodiments, the text may be designated on a path such that the text wraps around and image or element. In various embodiments, the System displays fonts and other elements of the page in the chosen style on the designer. Thus, during creation, a staff member can assess the visual elements of the page without accessing the Virtual Book.

In some embodiments, the System may facilitate adding further text boxes to a template or page. The staff member can select a shape for the text box, a border for the text box, background or fill for the text box, or other. The staff member can specify font, color, matte, and size for the text. The staff member can size, rotate, or move the text box. After placement of the text box, the user can place content, such as a vignette or stats, into the text box. Spell check and an appropriateness filter may assist the user with text.

Various customization tools may be provided that may be used for images, text, or other content. Such tools may include the ability to drop shadow on images, text, or elements. Dropping shadow creates a shadow behind the image or element.

After, or during, customization of the page, the staff member may save the page. The System may enable viewing of a page history such that the staff member can access and restore previously saved versions of the page. In some embodiments, the System enables viewing and restoring of the last 1000 versions of the page.

The System may further enable access to staff member history. For example, a staff member or advisor may look at staff member history for another staff member to look at what pages the staff member has worked on, which images the staff member has uploaded, etc.

Status Monitoring

A Page Status Grid is illustrated at FIG. 26. The page status grid 248 includes information regarding the page grid, the multiples, and the signatures.

Figure 27:
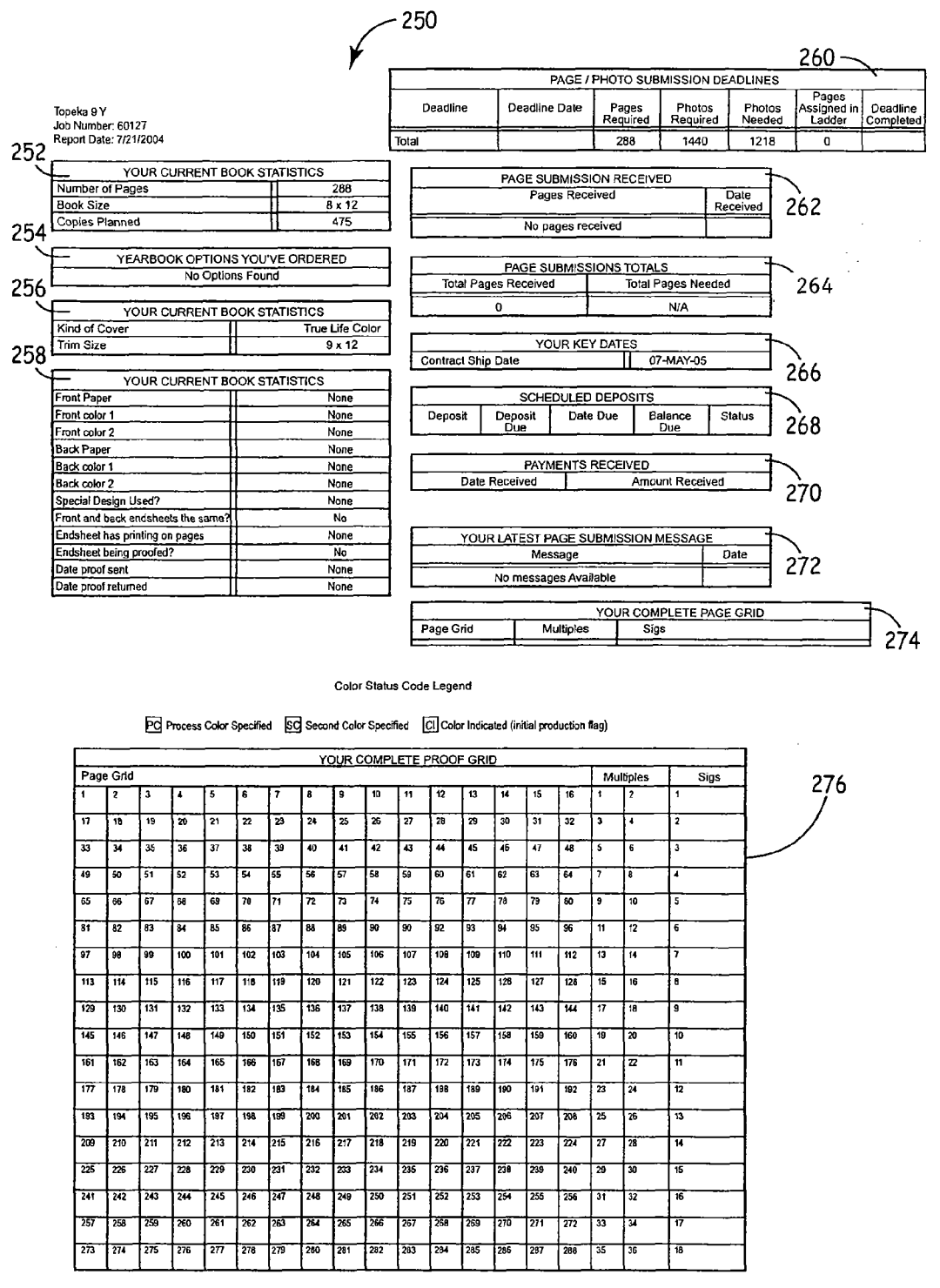

A Summary Report 250 is illustrated at FIG. 27. The summary report 250 may list the current book statistics 252, the yearbook options ordered 254, the yearbook cover information 256, the yearbook endsheet information 258, the page/photo submission deadlines 260, the page submissions received 262, the page submission totals 264, the key dates 266, the scheduled deposits 268, the payments received 270, the latest page submission message 272, and the complete page grid 274. A complete proof grid 276 with color coding may also be provided.

A current book statistics field 252 includes information regarding the number of pages, the book size, and the copies planned. A yearbook options field 254 indicates the yearbook options ordered. A yearbook cover information field 256 includes the kind of cover and the trim size. An endsheet information field 258 includes the front paper, the front color 1, the front color 2, the back paper, the back color 1, the back color 2, whether a special design was used, whether the front and back endsheets are the same, whether the endsheet has printing on the pages, whether the endsheet is being proofed, the date the proof was sent, and the date the proof was returned. A page/photo submission deadlines field 260 lists the deadline, the deadline date, the pages required, the photos required, the photos needed, the pages assigned in the ladder, and the deadline completion date. A page submissions received field 262 indicates what pages have been received and the date of receipt of the pages. A page submissions totals field 264 indicates the total number of pages received and the total number of pages needed. A key dates field 266 indicate key dates such as the contract ship date. A scheduled deposits field 268 indicates the deposit, the deposit due, the date due, the balance due, and the status. A payments received field 270 indicates the date and amount received. A latest submission message field 272 shows the latest submission message. A complete page grid field 274 lists the page grid, the multiples and the signatures. A color coded complete grid 276 provides a box for each page. The boxes may be color coded according to a color status code legend.

Sell

The yearbook system home page 34 provides a Sell tab 44 for accessing Sell information. The Sell information includes information and tools useful for yearbook staff to market and sell the yearbook. Generally, the Sell information includes both school specific information and informational content. The informational content is typically dynamic. In some embodiments, the business manager staff member has responsibility for marketing, sales, collateral, budget, etc. That staff member may further have responsibility for managing funds associated with the yearbook. The yearbook system thus further may include content to facilitate the business manager staff member's fulfillment of these roles.

A HOME flyer page 278 is shown in FIG. 28. The HOME (Home Ordering Made Easy) program allows yearbook staff to promote their yearbook with a colorful flyer that can be custom created online. The HOME program is an optional tool that may be used by yearbook staff.

Information from the photo coverage and index pages may be used to incentivize particular parents or students to place orders. For example, if a particular student is identified as having not purchased a yearbook, a flyer may be printed including a page of the yearbook having a picture of that student. The flyer, thus, shows an example of where the student appears in the yearbook.

A HOME web sales page 280 may be associated with the HOME program and is shown in FIG. 29. The HOME web sales page 280 shows the HOME sales results to date for any credit card purchases made on-line for the flyers.

Example informational content in the Sell category includes software for processing payments, such as ItPays software.

In some embodiments, the System may generate PDFs of invoices for emailing to purchasers of the yearbook. Alternatively the System may automatically format an email invoice for emailing to purchasers of the yearbook.

Distribute

The yearbook system home page 34 provides a Distribute tab 46 for accessing Distribute information. The Distribute information includes information and tools useful for yearbook staff to market and sell the yearbook. Generally, the Distribute information includes informational content. The informational content is typically dynamic.

The Distribute information includes tools for distribution. These tools are typically dynamic content and may be changed frequently. The distribute information may offer posters or promotional materials for display in the school.

Challenges with distribution often arise from yearbook options chosen by students—for example, a personalized yearbook or a yearbook with signature pages for signing.

Help

The yearbook system home page 34 provides a Help tab 49 for accessing Help information for aiding users in using the yearbook system. Generally, the Help information includes informational content. The informational content is typically dynamic.

Example help pages provided within the Help information include a help screen regarding the yearbook system as a whole, a help screen regarding an online yearbook creation tool, a help screen regarding ItPays software, an interactive help screen, or a page with helpful links.

Contact Us

The yearbook system home page 34 provides a Contact Us tab 51 for accessing Contact Us information. The Contact Us information includes information and tools useful for yearbook staff to contact a representative or production facility. Generally, the Contact Us information includes both school specific information and informational content. The informational content is typically dynamic.

A contact information page 282 is shown in FIG. 30. The contact information page 282 may provide contact information for a yearbook system representative, for technical support, and for after hours technical support. By providing an easily accessible page having such information, yearbook staff may easily resolve questions or issues.

The Contact Us information may also provide a page for providing feedback regarding the yearbook system. Further, the Contact Us information may provide a page for accessing feedback regarding the yearbook system provided by others.

Supplies

The yearbook system home page 34 provides a Supplies tab 53 for accessing Supplies information. The Supplies information includes supplies and ordering information for such supplies. The supplies may include, for example, generic posters or flyers advertising sales of the yearbook. Generally, the Supplies information includes both school specific information and informational content. The informational content is typically dynamic.

Thus, the yearbook system provides a tool for use by yearbook staff from the start to the finish of the yearbook process. The yearbook system may be used for educating yearbook staff regarding the yearbook process, for planning the yearbook, for creating the yearbook, for selling the yearbook (including merchandising), and for distributing the yearbook.

Yearbook System Management and Production

The yearbook system management and production can be thought of as the back-end of the yearbook system. That is, the yearbook system management works with the schools during creation—storing input information, communicating with the school, etc. The production facility ultimately produces the yearbook.

Figure 31:
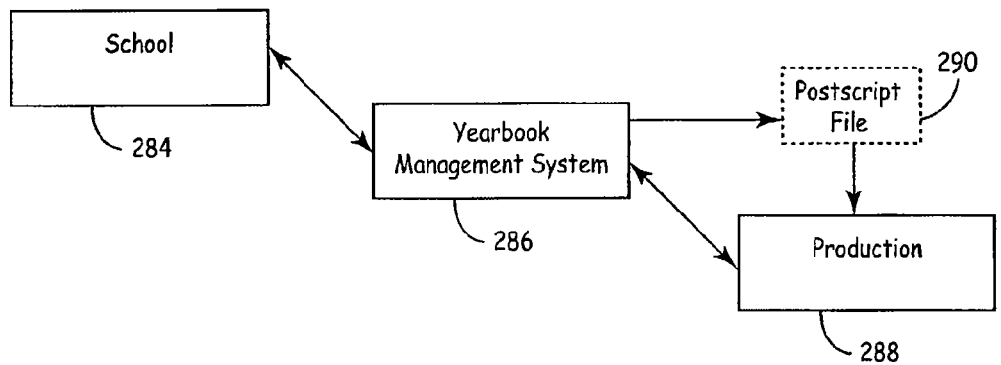
FIG. 31 illustrates the flow of communication between yearbook staff, a yearbook system management, and a production facility in accordance with one embodiment of the present invention.

Seamless running of the yearbook system involves extensive communication between the yearbook staff, the yearbook system management, and the production facility. Thus, the yearbook system facilitates cross-communication at a detailed level. FIG. 31 illustrates the flow of communication between the school 284 or yearbook staff, the yearbook system management 286, and the production facility 288. The yearbook process spans several months—generally from the start of the school year until mid to late spring. If communication is not ongoing during the entire yearbook process, it may be very difficult to finalize the yearbook on time. For example, if deficiencies with submissions are not identified and address throughout the process and are, instead, identified and addressed only after all pages have been submitted, there may not be sufficient time for the staff to correct the deficiencies and still have the yearbook produced on schedule.

As shown in FIG. 31, generally there is extensive communication between the school 284 and the yearbook system management 286. This communication includes submissions by the school 284, for example photo submissions or page submissions and responses from the yearbook system management 286. For example, the school 284 (or other contributors such as parents) may submit physical photos to the production facility for scanning. The production facility 288 scans the photos. The photos are made available on a yearbook server at the yearbook system management 286. The yearbook system management 286 notifies the school 284 that the photos are available. Similarly, a school 284 may submit completed pages to the yearbook system management. The yearbook system management 286 acknowledges receipt of the submission. Once the page is submitted, all the information of the page is written into a postscript file 290 and sent to the production facility 288. A pdf file of the submitted page is made and reviewed by production facility. If there are deficiencies in the submission, the yearbook system management 286 notifies the school 284 so that the school 284 can correct the deficiencies and re-submit the page. The pdf pages will be further processed in the production facility and printed using appropriate out devices.

In some embodiments, a school may develop pages on a desktop publishing system and provide designed pages to the yearbook management system. The designed pages then may be printed and scanned in by the production facility and incorporated into a build ladder of the yearbook system. The build ladder may be provided online such that the school then may access the build ladder, view the virtual book, and use other tools of the yearbook management system.

Figure 32:
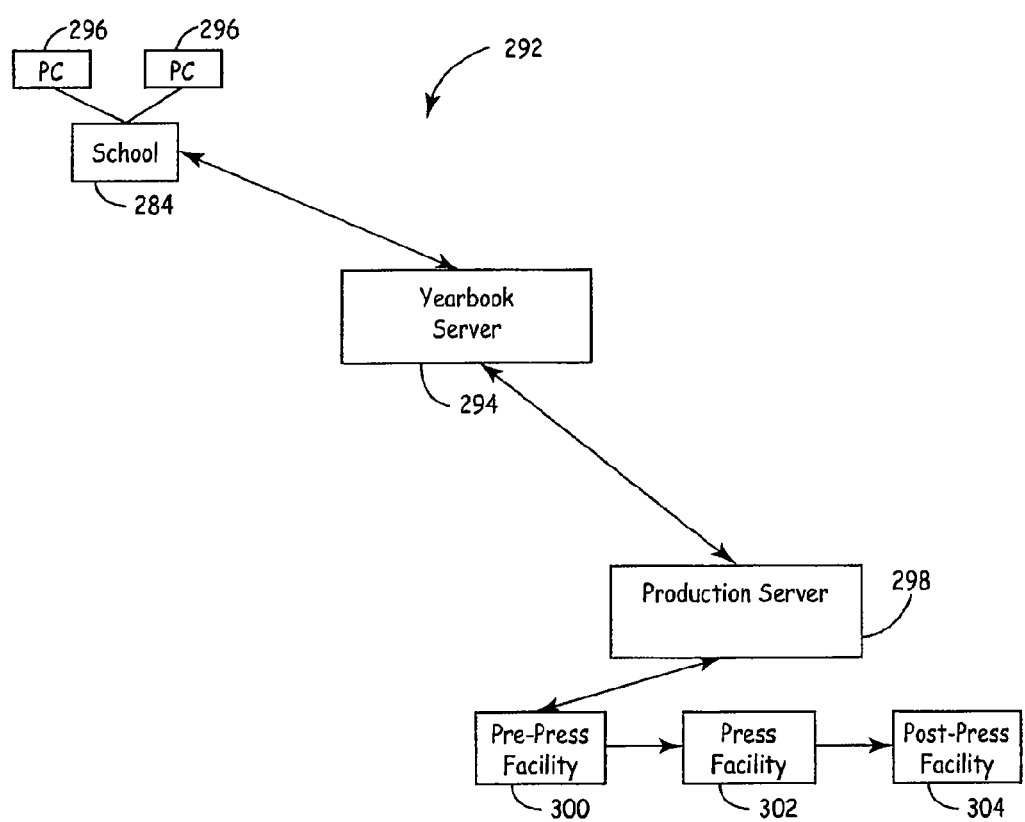
FIG. 32 illustrates a block diagram of the components of a yearbook system in accordance with one embodiment of the present invention.

FIG. 32 illustrates a block diagram of the components of the yearbook system. The yearbook system 292 includes a yearbook server 294 at the yearbook system management. Users at the school 284 communicate with the yearbook server 294 via the internet using individual personal computers 296 (or other suitable device, for example, a PDA).

The yearbook server 294 includes and communicates with the personal computers 296 via the internet or other suitable connection, receiving user creation information, prompting users for further information when necessary, and transmitting information to the user. The yearbook server 294 further communicates with a production server 298 at the production facility to update the production Database 298 such that the yearbook database 294 and production database 298 are in sync. Note that each of the yearbook server 294 and the production server 298 may be database servers. The production facility may be several facilities including a pre-press facility 300, a press facility 302, and a post-press facility 304. Alternately, these several facilities may be provided in a single facility. The production server 298 periodically synchronizes with the yearbook server 294, for example, in providing specific customer images to the yearbook server.

Figure 33:
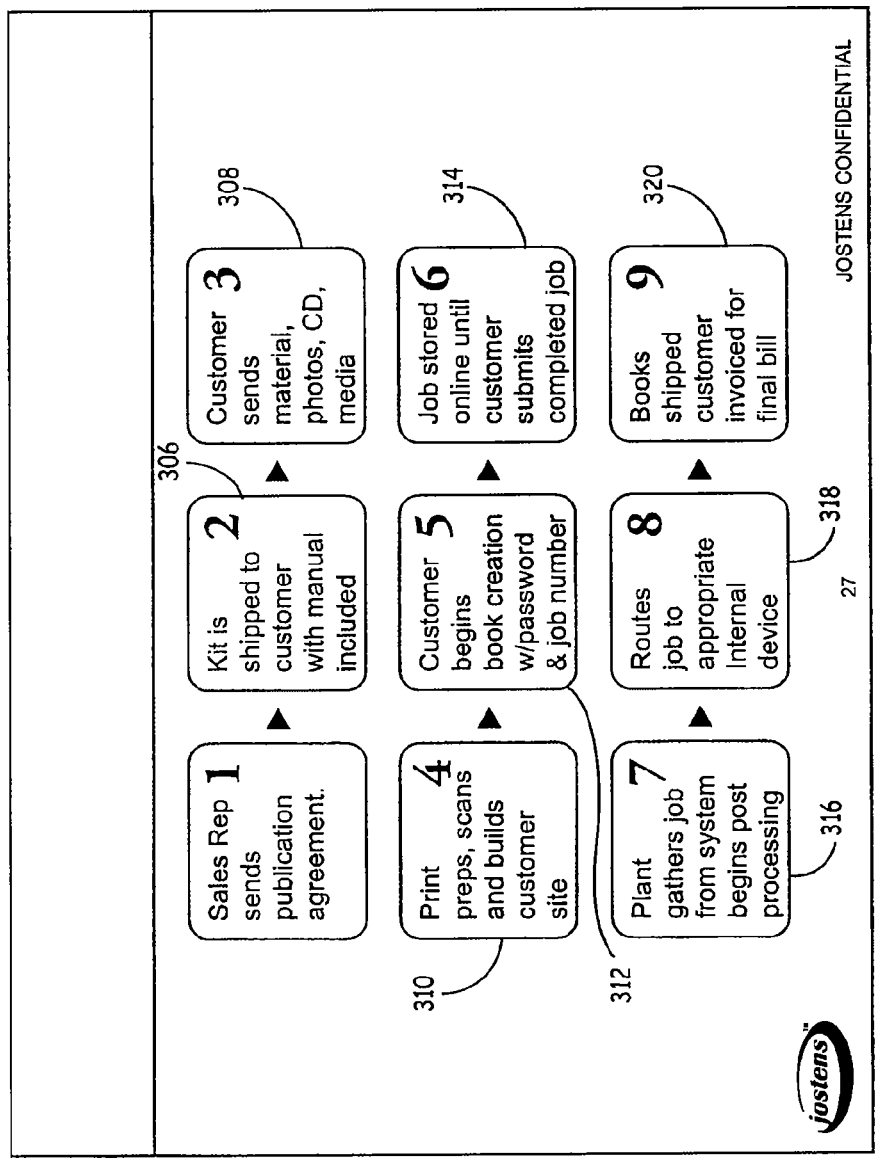
FIG. 33 illustrates a block diagram of creating a yearbook in accordance with one embodiment of the present invention.

FIG. 33 is a block diagram of the overall process of creating a yearbook using the present invention. After the user has initiated the process, a kit is shipped to the user, shown at block 306. This kit may include a shipping carton, mounting sheets, photo sorting envelopes, an instruction manual, and a return shipping carton. While the creation of yearbooks in accordance with the present invention generally is online, there are portions of the yearbook creation that may deal with non-digital or non-electronic items. For example, not all photographs may be available in digital form. These photographs may be scanned in by the school or may be shipped to the pre-press production facility for scanning in. Thus, as shown at block 308, the user may send material, photos, CDs, and media to the pre-press production facility (anything sent by the user may be returned after processing). Shown at block 310, the pre-press production facility preps, scans and uploads the materials to the user site. Access to the user site may be username, password, and/or job number secured. The user creates the yearbook using the password and/or job number, as shown at block 312. The created pages are stored at the yearbook server until the user submits the completed page, shown at block 314. Once the user has submitted the completed page, the yearbook server gathers the page and transmits the page to a production server to begin post processing, shown at block 316. The production server routes portions of the job to the appropriate section of the production facility, shown at block 318, for example to the press facility for printing yearbook pages. After completed, the post-press facility ships the yearbooks to the user, shown at block 320.

Figure 34:
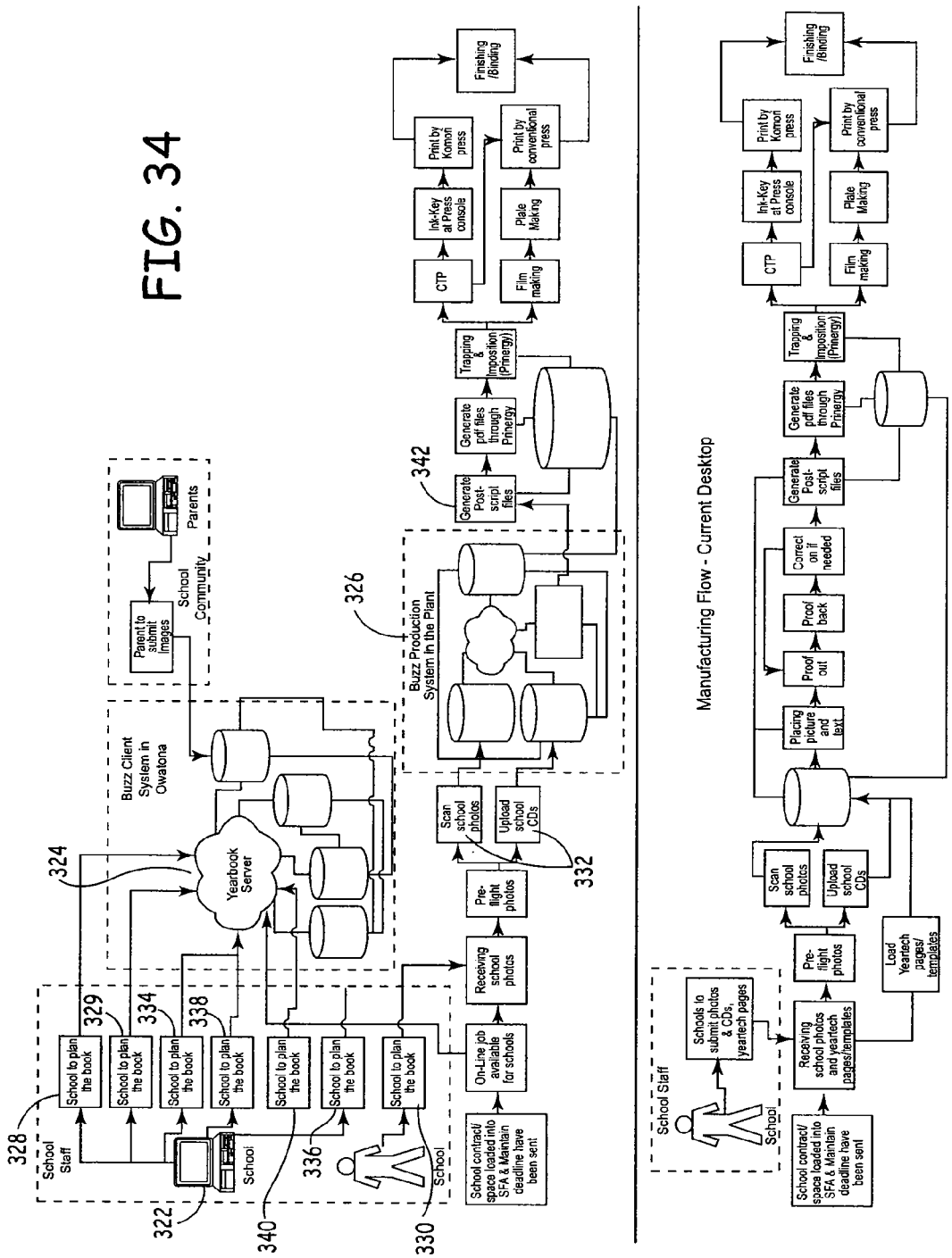
FIG. 34 illustrates a process of creating a yearbook using the components of a yearbook system in accordance with one embodiment of the present invention.

FIG. 34 illustrates a juxtaposition of the process of FIG. 33 on the components of FIG. 32. The school 322 plans the yearbook, shown at block 328, and uploads images, shown at block 329. Additionally, as shown at block 330, the school 322 may submit photos, CDs and other materials to the production facility 326. These images are scanned or uploaded by pre-press facility, shown at block 332, and transmitted as low resolution images to the yearbook server 324 for access by the school 322. Using an online creation system, the school 322 builds and submits pages, shown at blocks 334 and 336, to the yearbook server 324. The pages may be submitted from the build ladder or may be submitted directly from the designer. The school may selfproof pages on the screen, shown at block 338, and check page status online, shown at block 340. Once submitted, the pages are transmitted to the production server 326 as a postscript file, shown at block 342. The production server processes the pages for printing, for example, translating the submitted pages into a format for proceeding through the regular preparation for production of the yearbook, print them and finish the yearbooks.

Figure 35:
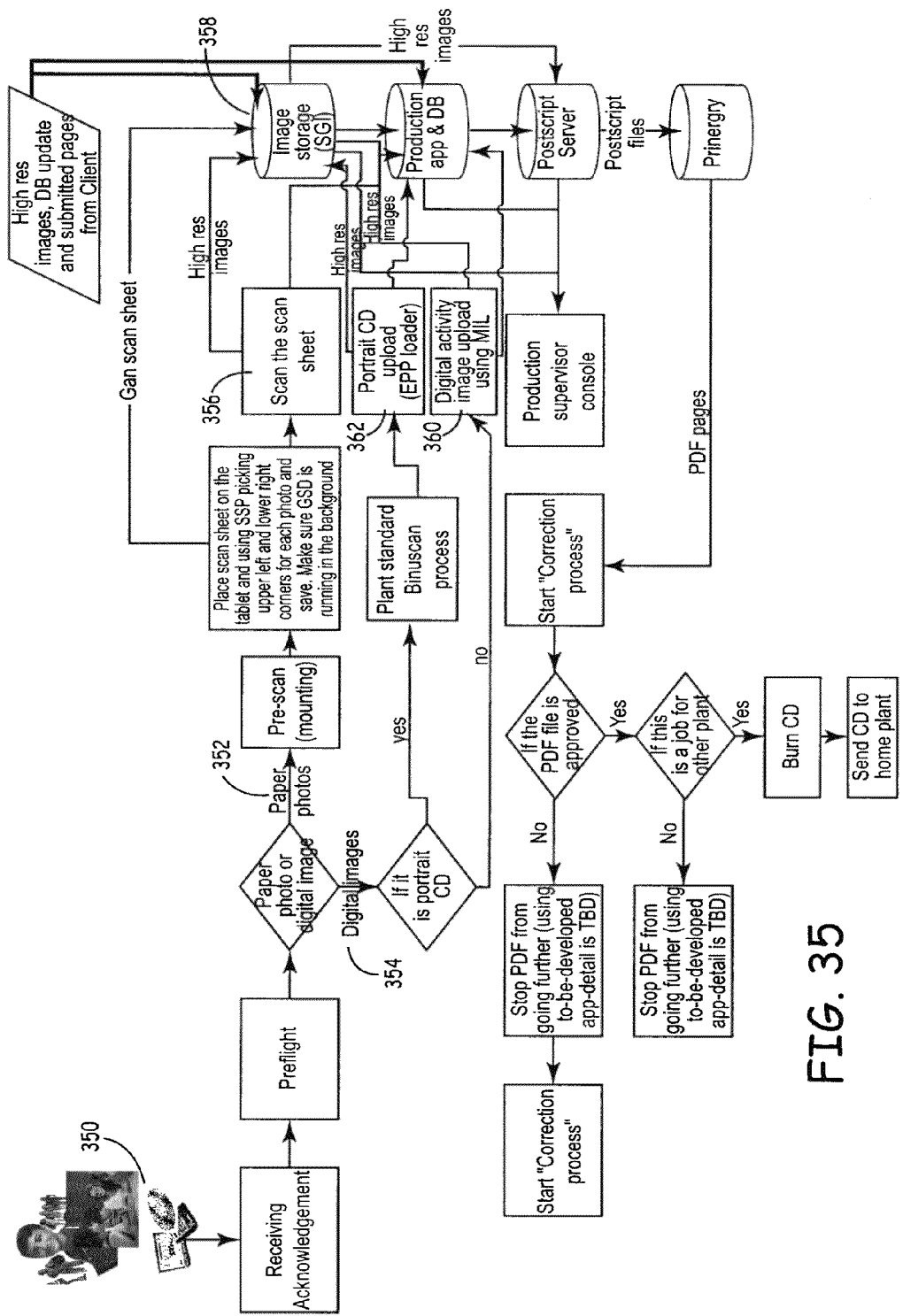
FIG. 35 illustrates a process for pre-press scanning of images in accordance with one embodiment of the present invention.

FIG. 35 illustrates a completed production operating process. Upon receipt of the materials 350 for scan and upload, the material is associated with a job number and category name. Typically, customer photos include activity photos and portrait photos and may be formatted as physical photos 352 or as digital images 354 on photo CDs. Physical photos are batch scanned 356 and disassembled into individual images and uploaded to production image storage 358 using production software to communicate with the production database. Activity photo CDs may be uploaded 360 to the production image storage 358 using suitable production software to communicate with the production server. Portrait CDs may be received from school photographers. Portrait CDs typically include portrait images associated with a student name list. The portrait images and student name list may be uploaded 362 to the production image storage 358 using suitable production software to communicate with the production database. Once the images are uploaded to the production image storage, a low resolution version of the images and thumbnails may be generated. Those low resolution images and thumbnails are synced to yearbook server for school use in yearbook creation. High resolution images stored in production image storage are used when the postscript file is generated.

The job may be archived for future access, for example for reprints. One suitable manner of archiving is to convert the "pages" created using the present invention into PDF files. The PDF files may then be archived on an archiving server or on media. Alternately, if desired, individual images may be archived.

Although the present invention has been described with reference to preferred embodiments, persons skilled in the art will recognize that changes may be made in form and detail without departing from the spirit and scope of the invention.

What is claimed is:

1. A yearbook system comprising:
   a yearbook server in communication with a plurality of user portals over a network, the yearbook server having computer-implemented instructions stored thereon, the instructions comprising:
   a user component through which a user may design and create a yearbook, the user component comprising:
   an image library having a plurality of photos associated with names of subjects in the photos;
   a create module where photos from the image library are used to populate pages of the yearbook; and
   a coverage module configured to track the appearance of students in the yearbook, the coverage module including an alert module configured to receive an appearance input and send an alert when a subject in the yearbook appears less than the appearance input, the coverage module comprising:
   a coverage page in communication with the create module and identifying which photos from the photo library are used to populate which pages;
   an index in communication with the coverage page and the image library and identifying a list of appearances of each subject in the plurality of photos and the page of the yearbook where the subject appears;
   a culling module that culls names from portrait pages of the yearbook to create a database of names against which coverage is checked; and
   a monitoring module configured to monitor coverage of the database of names using the coverage page by comparing the names in the database to the subjects in the index and identifying the number of appearances of each of the names in the database; and
   a production component through which the yearbook is converted to a printed output;
   wherein the user component and the production component interact such that submissions are made to the production component via the user component.

2. The yearbook system of claim 1, wherein the user component includes tools for planning the yearbook, for creating the yearbook, for selling the yearbook, and for distributing the yearbook.

3. The yearbook system of claim 1, wherein the user component includes a visual representation of progress of the yearbook towards completion.

4. The yearbook system of claim 1, wherein the user component includes a virtual book for virtual viewing of yearbook pages completed, in progress, and not yet started.

5. The yearbook system of claim 1, wherein the user component includes a photo submission component for accepting photos submitted by community members.

6. The yearbook system of claim 1, wherein the user component comprises at least two access levels such that an advisor may access information at one level and staff may access information at another level.

7. The yearbook system of claim 1, wherein the user component may be used to plan and develop portrait pages and activity pages.

8. The yearbook system of claim 1, wherein the system is configured for interaction with a school, a school community, a sales force, customer support, and manufacturing.

9. The yearbook system of claim 1, wherein the user component enables a user to create the yearbook using a desk top publishing application.

10. The yearbook system of claim 1, wherein the user component enables a user to create the yearbook using an on-line creation tool.

11. The system of claim 1, wherein the instructions further comprise a purchase tracking component configured to track students that have not purchased a yearbook.

12. The system of claim 11, wherein the purchase tracking component tracks students that appear in the yearbook a number of times that is equal to or greater than a selected appearance value.

13. The system of claim 12, wherein the selected appearance value is equal to the appearance input.

14. The system of claim 12, wherein the purchase tracking component provides a notification to students that have not purchased a yearbook and that appear in the yearbook a number of times that is equal to or greater than the selected appearance value.

15. The system of claim 14, wherein the notification provides details relating to an appearance of the respective student in the yearbook.

16. The system of claim 15, wherein the details includes an image of the respective student in the yearbook.

17. A method for creating a yearbook comprising:
   receiving, from a user, into an image library, and via a user portal in communication with a server over a network, a plurality of photos of a plurality of respective subjects for arrangement on a plurality of pages to create a yearbook, the image library containing the plurality of photos and associating names of the respective subjects with the respective photos in which they appear;

receiving, from a user and via a user portal in communication with a server over a network, input defining the location in the yearbook of each the plurality of photos, the input being supplied as the user creates a page of the yearbook by using a photo from the image library to populate the page;

creating a coverage page by determining which photos are on which pages based on the input and including an index based on the input and the names associated with the photos in the image library, the index showing a list of appearances of each subject in the plurality of photos and the page of the yearbook where the subject appears;

culling names of students from portrait pages and developing a database of names against which coverage is checked;

receiving an appearance input;

monitoring coverage of the database of names using the coverage page, by comparing the names in the database to the subjects in the index and identifying the number of appearances of each of the names in the database;

performing an alert when a name in the database has a number of appearances less than the appearance input.

18. The method of claim 17, further comprising, notifying a subject when the subject appears in the yearbook a number of times equal to or greater than the appearance input.

* * * * *

UNITED STATES PATENT AND TRADEMARK OFFICE
CERTIFICATE OF CORRECTION

| | | |
|---|---|---|
| PATENT NO. | : 8,839,094 B2 | Page 1 of 1 |
| APPLICATION NO. | : 12/486661 | |
| DATED | : September 16, 2014 | |
| INVENTOR(S) | : Andrew Pearson et al. | |

It is certified that error appears in the above-identified patent and that said Letters Patent is hereby corrected as shown below:

On the Title Page

In the references cited, page 2, delete "2,672,761" and insert --6,826,727-- therefor.

In the Specification

Column 8, Line 56, delete "122" and insert --112-- therefor.

Column 9, Line 63, delete "151" and "153".

Column 9, Line 64, delete "151".

Column 9, Line 65, delete "153".

Column 10, Line 1, delete "151" and "153".

Column 11, Line 37, delete "204".

Column 11, Line 38, delete "206".

Column 11, Line 39, delete "208".

Column 15, Line 23, delete "244".

Signed and Sealed this
Seventeenth Day of November, 2015

Michelle K. Lee
*Director of the United States Patent and Trademark Office*